United States Patent [19]

Takeda et al.

[11] Patent Number: 5,658,687
[45] Date of Patent: Aug. 19, 1997

[54] BATTERY AND ITS MANUFACTURING METHOD

[75] Inventors: Kazunari Takeda; Syuichi Izuchi, both of Takatsuki, Japan

[73] Assignee: Yusasa Corporation, Osaka, Japan

[21] Appl. No.: 318,834

[22] PCT Filed: Feb. 18, 1994

[86] PCT No.: PCT/JP94/00246

§ 371 Date: Oct. 18, 1994

§ 102(e) Date: Oct. 18, 1994

[87] PCT Pub. No.: WO94/19840

PCT Pub. Date: Sep. 1, 1994

[30] Foreign Application Priority Data

Feb. 23, 1993 [JP] Japan ................................ 5-059631
Feb. 25, 1993 [JP] Japan ................................ 5-062994
Mar. 8, 1993 [JP] Japan ................................ 5-075262
Mar. 8, 1993 [JP] Japan ................................ 5-075263

[51] Int. Cl.[6] ........................................ H01M 6/18

[52] U.S. Cl. .................... 429/192; 429/212; 429/218; 29/623.1

[58] Field of Search ................... 429/213, 192, 429/212, 218, 217; 29/623.1

[56] References Cited

U.S. PATENT DOCUMENTS 5,237,031  8/1993  Kubota et al. .................... 429/213 X

*Primary Examiner*—Anthony Skapars
*Attorney, Agent, or Firm*—Evenson, McKeown, Edwards & Lenahan P.L.L.C.

[57] ABSTRACT

A battery having a cathode composite made of an ion-conductive high-molecular weight compound; an electrolyte made of the ion-conductive high-molecular weight compound; and an anode made of an electrode active material or a composite which includes the ion-conductive high-molecular weight compound. The amount of sulphate ion, para-toluenesulfonate ion, chlorine ion, polyethylene glycol, acrylic acid and methacrylic acid etc. inside the battery is controlled to 0.1 wt % or less.

14 Claims, 9 Drawing Sheets

BATTERY AND ITS MANUFACTURING METHOD

BACKGROUND OF THE INVENTION

This invention relates to a battery operating reversibly at room temperature, comprising an improved cathode, electrolyte and anode, and a method for manufacturing such a battery.

With a recent tendency to design various electric equipment in a micro-electronic form, batteries have been housed in an electric apparatus and integrated with the electronic elements and the circuit, such as in power sources for memory back-up of various electric devices. For this reason, the demand for minimizing the size, weight and thickness of batteries and the need for a battery having a high energy density have been increasing. In the field of primary batteries, a small-sized and light-weight battery such as a lithium battery has already been put to practical use, however, its application is limited. Under these circumstances, in the field of secondary batteries, a battery utilizing a nonaqueous electrolyte, which can be made smaller in size and weight, attracts public attention at present as an alternate battery to replace the conventional lead battery and nickel-cadmium battery. However, in battery utilizing a nonaqueous electrolyte, an electrode active material which satisfies practical physical properties, such as cycle characteristics and self-discharge characteristics, has not yet been found. Therefore, investigations are still being carried on in many research organizations.

In order to develop a small-sized and light-weight battery having a high energy density and a high reliability, it is necessary to examine the following problem areas (1) and (2):

(1) the electrode active material and the electrode;

(2) the electrolyte.

As for problem area (1), the inventor examined a film type battery, that is, a battery having cell units with a thicknesses of 100 to 500 µm, also called a "sheet-shaped" battery. With this kind of battery, however, the problem arose that the manufacture of metallic lithium foil having a desirable performance was somewhat difficult from a technical point of view and that therefore, the manufacturing process of such a battery became complicated. Further, in the secondary battery, the problem of lithium dendrite formation and passivation of the interface took place so that use of the metallic lithium was restricted. Therefore, investigations on alloys including lithium metals such as lithium-aluminum, lithium-lead and lithium-tin, have been actively carried out. However, during testing, the electrode cracked or broke into fine pieces due to repeated charging and discharging so that the cycle characteristic was not improved when these alloys were used, because these alloys, such as the lithium-aluminum alloy, have little strength. As an alternate way of restricting the formation of lithium dendrite, investigations on the selection of an electrolyte salt and improvement in separators have been examined. As for the separator, it has been attempted to restrict the formation of lithium dendrite by laminating non-woven fabrics made of polypropylene or glass fiber. However, a substantial solution has not yet been found.

Currently electrode active materials utilizing intercalation or a doping phenomenon of a layer compound are being specially studied in many research organizations. These materials are expected to have extremely excellent charge/discharge cycle characteristics, because a theoretically complicated chemical reaction does not occur at the time of the electrochemical reaction in charging and discharging. Use of carbon material as the electrode active material is a method which was developed, during the studies mentioned above, as a solution for problems of cycle characteristics and self-discharge characteristics of the electrode active material. Features of this carbon material are a high doping capacity, a low self-discharge rate and an excellent cycle characteristic. A special feature to mention is that it has a base-potential very close to that of metallic lithium.

On the other hand, problem area (2) is described below. A liquid electrolyte, especially prepared by dissolving an ionic compound in an organic electrolyte, has so far been used for the electrolyte of a battery utilizing electrochemical reactions and electrochemical devices other than the battery, such as electric double-layer capacitors and electrochromic elements etc. However, since there have been problems such as leakage of electrolyte from the battery and elution and evaporation of the electrode material etc. when a liquid electrolyte has been used, problems of long-term reliability and movement of electrolyte during the sealing process have remained unsolved. In order to solve these problems, that is, to improve the resistance of the solution to leakage and the long-term reliability, an ion-conductive high-molecular weight compound having a high ionic conductivity has been developed and further studied.

Ion-conductive high-molecular weight compounds currently being studied are straight-chain homo- or co-polymers, network crosslinked homo- or co-polymers or comb-shaped homo- or co-polymers having ethylene oxide as their basic unit. Generally, crystallization is avoided by making the compound in the form of a network crosslinked polymer or comb-shaped polymer in order to increase the ionic conductivity at low temperatures. Especially, the ion-conductive high-molecular weight compound using network crosslinked polymers has a high mechanical strength and has excellent ionic conductivity at low temperatures.

Electrochemical cells using such ion-conductive high-molecular weight compounds are described widely in many patent documents, such as, for example, U.S. Pat. No. 4,303,748 (1981) by Armand et al., U.S. Pat. No. 4,589,197 (1986) by North, and U.S. Pat. No. 4,547,440 (1985) by Hooper et al. A feature of these cells is the use of an ion-conductive high-molecular weight compound prepared by dissolving an ionic compound in a high-molecular weight compound having a polyether structure.

In order to use the ion-conductive high-molecular weight compound as the electrolyte of batteries utilizing electrochemical reactions and electrochemical devices other than the battery, the high-molecular weight compound must have both high ionic conductivity and high mechanical properties (mechanical strength and flexibility etc.). However, these properties contradict each other. In many patent documents described above, for example, the compound is operated at a high temperature because the ionic conductivity at a temperature lower than room temperature decreases down to below a practical range. Therefore, as a simple way to improve the ionic conductivity for example, a method is proposed, in Published Patent Application (KOKAI) No. 59-149601, Published Patent Application (KOKAI) No. 58-75779, U.S. Pat. No. 4,792,504 etc., wherein an organic solvent (preferably, an organic solvent with high permittivity) is added to the ion-conductive high-molecular weight compound to maintain a solid state. In this method, however, while the ionic conductivity is improved the mechanical strength is worsened. In the electrode active material utilizing intercalation or a doping phenomenon of the layer compound, expansion and contraction of the electrode active material are produced accompanied by charging and discharging. To cope with this problem, the mechanical strength of the electrode and the electrolyte must be improved.

When an ion-conductive high-molecular weight compound is used as the electrolyte for electrochemical devices, it becomes necessary for the electrolyte to be made in the shape of a film in order to reduce the internal resistance. Especially, this is important for film type batteries. In the case of ion-conductive high-molecular weight compounds, it is possible to work a uniform film easily into shape. Several methods for this purpose are known, for example, such as a method in which a solution of the ion-conductive high-molecular weight compound is cast and the solvent is evaporated and removed, a method in which a polymeric monomer or macromer is applied to a substrate to be heated and polymerized, or a method in which curing is done with radiation. It is possible to obtain a uniform film when these methods are used. However, short-circuiting sometimes occurs due to breakage of the electrolyte layer caused by its compression deformation when laminating the ion-conductive high-molecular weight compound in between the electrodes to assemble the battery and electrochromic element etc. Accordingly, in order to make the ion-conductive high-molecular weight compound into a uniform film, an increase of mechanical strength is important, in addition to good ionic conductivity.

SUMMARY OF THE INVENTION

It was found that the following problems arose when an ion-conductive high-molecular weight compound was used for the battery. In a secondary battery, gas was produced which caused an expansion of the battery when was used for the electrode active material of the anode, and a passive film formed on the anode when a carbon material was used for the anode. These problems resulted in poor battery performance due to an increase in impedance inside the battery or lowering of long-term reliability or safety. Even in a primary battery, similar problems arose because water was extracted from the electrode composite during long-term preservation.

The cause of these problems proved to be attributable to the fact that the phenomena shown in the following (1) to (4) took place because materials used when manufacturing the ion-conductive high-molecular weight compound remained in the ion-conductive high-molecular weight compound. A material prepared so that a high-molecular weight compound having a reactive double-bond and a polyether structure is polymerized so as to have a crosslinked network structure, may be mentioned as the ion-conductive high-molecular weight compound. The high-molecular weight compound is generally prepared in such a way that an esterification reaction is carried out by using polyethylene glycol, acrylic acid or methacrylic acid, sulfuric acid or para-toluenesulfonic acid, and organic solvent. The resulting material is then neutralized by using alkali metal hydroxide and subsequently washed by using an alkali metal chloride aqueous solution. NaOH and KOH etc. for example may be used as the alkali-metal hydroxide; and NaCl, KCl, and LiCl etc. for example are used for the alkali-metal chloride. Multivalent ions such as $Ca^{2+}$, $Fe^{2+}$, $Cu^{2+}$, $Ni^{3+}$, $Fe^{3+}$, $Co^{3+}$ and $Cr^{3+}$ etc. are likely to mingle in water. For this reason, sulphate ion, para-toluenesulfonate ion, chlorine ion, polyethylene glycol, acrylic acid, methacrylic acid, $Na^+$, $K^+$, $Ca^{2+}$, $Fe^{2+}$, $Cu^{2+}$, $Ni^{3+}$, $Fe^{3+}$, $Co^{3+}$ and $Cr^{3+}$ etc. remain in the prepared ion-conductive high-molecular weight compound, and it is difficult to remove these ions.

(1) Water is extracted from the electrode composite by repeating charge/discharge cycles. Together with the sulphate ion, para-toluenesulfonate ion, chlorine ion, and ethylene glycol etc. remaining in the ion-conductive high-molecular weight compound, the water reaches the lithium metal forming the anode through the electrolyte comprising the ion-conductive high-molecular weight compound. These materials react with the lithium metal to produce hydrogen gas which expands the battery.

(2) In the same way as in (1), the sulphate ion, para-toluenesulfonate ion and polyethylene glycol etc. reach the carbon material forming the anode, such that a passive film is formed on a surface of the carbon material.

(3) When acrylic acid or methacrylic acid remains in the high-molecular weight compound, forming a material of the ion-conductive high-molecular weight compound of large residual quantity, the stability of the high-molecular weight compound is lowered and this compound is freely polymerized before manufacturing the ion-conductive high-molecular weight compound, which lowers the yield, qualitative stability and uniformity of the ion-conductive high-molecular weight compound. When films comprising such an ion-conductive high-molecular weight compound are used and laminated between the electrodes, the films break due to compression deformation which causes short-circuiting when assembling the batteries and electrochromic elements etc.

(4) When the ion-conductive high-molecular weight compound includes ions other than those performing ionic conduction, the ionic conductivity drops.

This invention is made in consideration of the above-mentioned problems. An object of this invention is to provide a battery having any one of properties shown in the following (1) to (4), and to provide a method for manufacturing such a battery.

(1) In cases where lithium metal is used for the electrode active material of the anode, the expansion of the battery is prevented such as to improve battery performance, long-term reliability and safety are improved.

(2) In cases where carbon material is used for the anode, the formation of a passive film in the anode is prevented, such as to improve battery performance, long-term reliability and safety.

(3) The qualitative stability of ion-conductive high-molecular weight compounds forming the composition material is improved, the breakage of film comprising the ion-conductive high-molecular weight compounds because of compression deformation can be prevented, and the short-circuiting can be prevented.

(4) The ionic conductivity of ion-conductive high-molecular weight compounds are improved and battery performance is improved.

A first preferred embodiment provides a battery containing a cathode composite having an ion-conductive high-molecular weight compound as its composition material, an electrolyte comprising the ion-conductive high-molecular weight compound, and an anode composite having the ion-conductive high-molecular weight compound as its composition material, wherein the content of at least one of sulphate ion, para-toluenesulfonate ion, chlorine ion, polyethylene glycol, acrylic acid and methacrylic acid, which remain in the battery, is limited to 0.1 wt % or smaller.

In the first embodiment, the production of hydrogen gas and the formation of a passive film on the anode are restricted, because the content of at least one of sulphate ion, para-toluenesulfonate ion, chlorine ion, polyethylene glycol, acrylic acid and methacrylic acid, is controlled to 0.1 wt % or smaller in the battery. Consequently, performance, long-term reliability and safety of the battery are improved.

A second preferred embodiment provides a battery including a cathode composite having an ion-conductive high-molecular weight compound as its composition material, an electrolyte comprising the ion-conductive high-molecular weight compound, and an anode composite having the ion-conductive high-molecular weight compound as its composition material wherein lithium ion performs ionic conduction; wherein the content of at least one alkali metal ion other than the lithium ion and multivalent ions, which remain in the battery, is limited to 0.1 wt % or smaller.

In the second battery, the ionic conductivity of the ion-conductive high-molecular weight compound is improved and battery performance is also improved because the content of the ion other than the lithium ion performing the ionic conduction, is 0.1 wt % or smaller.

A third preferred embodiment provides a battery including a cathode composite having an ion-conductive high-molecular weight compound as its composition material, an electrolyte comprising the ion-conductive high-molecular weight compound, and an anode composite having the ion-conductive high-molecular weight compound as its composition material material; wherein a radical scavenger is included in the battery and its content is limited to 0.1 wt % or smaller.

When the content of radical scavenger in the battery is larger than 0.1 wt %, hydroxyl groups included in the radical scavenger have a negative influence on battery characteristics, especially on long-term preservation, so that long-term reliability decreases. In the third embodiment, long-term reliability decreases. In the third embodiment, however, the worsening of battery characteristics is restricted because the content of radical scavenger in the battery is 0.1 wt % or smaller.

The ion-conductive high-molecular weight compound in the above first through third embodiments is one which is prepared by polymerizing at least one high-molecular weight compound of formula (I) and formula (II) and including at least one ionic compound. The above-mentioned high-molecular weight compound is one which is prepared in such a way that an esterification reaction is carried out by using polyethylene glycol, acrylic acid or methacrylic acid, sulfuric acid or para-toluenesulfonic acid, and an organic solvent. The resulting material is then neutralized by using alkali metal hydroxide and subsequently washed by using alkali metal chloride aqueous solution.

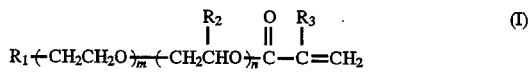

($R_1$, $R_2$ and $R_3$ represent hydrogen or a lower alkyl group having 1 or more carbon atoms, and m and n are integers such that $m \geq 1$, $n \geq 0$ and $n/m = 0$ to 5.)

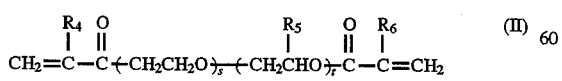

($R_4$, $R_5$ and $R_6$ represent hydrogen or a lower alkyl group having 1 or more carbon atoms and s and t are integers such that $s \geq 3$, $t \geq 0$ and $t/s = 0$ to 5.)

A high-molecular weight compound shown by formula (VII) may also be used.

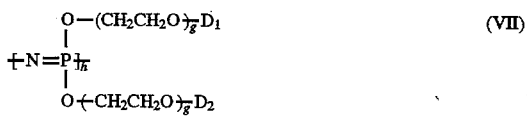

(h and g represent an integer wherein $h \geq 1$ and $g \geq 1$, and $D_1$ and $D_2$ represent any one of the groups shown below by formula (VIII), formula (IX) and formula (X).)

($R_7$ represents hydrogen or a lower alkyl group having 1 or more carbon atoms.)

($R_8$ represents hydrogen or a lower

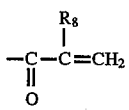

alkyl group having 1 or more carbon atoms.)

($R_9$ and $R_{10}$ represent hydrogen or a lower alkyl group having 1 or more carbon atoms.)

Since such an ion-conductive high-molecular weight compound is a cross-linked polymer formed by an ether bond, it does not include an intermolecular weight hydrogen bond and becomes a structure with a low glass transition temperature. For this reason, migration of dissolved ionic compound becomes extremely easy in such an ion-conductive high-molecular weight compound. Formula (I) represents a monoacrylate or monomethacrylate of polyethylene glycol, and formula (II) represents a diacrylate or dimethacrylate of polyethylene glycol.

In the above first through third embodiments, at least the cathode composite or anode composite may include a binder. Thereby, the mechanical strength of the cathode composite and anode composite are remarkably improved.

$Na^+$ and $K^+$ etc. may be mentioned as the alkali metal ion, and $Ca^{2+}$, $Fe^{2+}$, $Cu^{2+}$, $Ni^{3+}$, $Fe^{3+}$, $Co^{3+}$ and $Cr^{3+}$ etc. may be mentioned as the multivalent ion.

At least one compound shown below by formula (III), formula (IV), formula (V) and formula (VI) may be used for the radical scavenger.

($R_{11}$ represents an alkyl group or an alkoxyl group, which has 1 or more carbon atoms, or a hydroxyl group.)

($R_{12}$ represents an alkyl group or an alkoxyl group, which has 1 or more carbon atoms, or a hydroxyl group.)

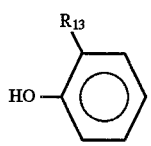

($R_{13}$ represents an alkyl group or an alkoxyl group, which has 1 or more carbon atoms, or a hydroxyl group.)

($R_{14}$, $R_{15}$ and $R_{16}$ represent a lower

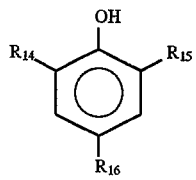

alkyl group or lower alkoxyl group, which has 1 or more carbon atoms, or a hydroxyl group.

A fourth embodiment provides a method of manufacturing a battery including a cathode composite having an ion-conductive high-molecular weight compound as its composition material, an electrolyte comprising the ion-conductive high-molecular weight compound, and an anode composite having the ion-conductive high-molecular weight compound as its composition material or an anode comprising an electrode active material; wherein at least one of the high-molecular weight compounds shown by formula (I) and formula (II) is used, the high-molecular weight compound is polymerized to manufacture the ion-conductive high-molecular weight compound including at least one of the ionic compound, and the foregoing high-molecular weight compound includes a radical scavenger.

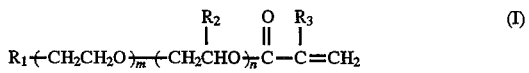

($R_1$, $R_2$ and $R_3$ represent hydrogen or a lower alkyl group having 1 or more carbon atoms, and m and n are integers such that $m \geq 1$, $n \geq 0$ and n/m=0 to 5.)

($R_4$, $R_5$ and $R_6$ represent hydrogen or a lower alkyl group having 1 or more carbon atoms, and s and t are integers where $s \geq 3$, $t \geq 0$ and t/s=0 to 5.)

In the above fourth embodiment, the radical scavenger functions as a stabilizer for the high-molecular weight compound. That is, when the radical scavenger is not included, the high-molecular weight compound polymerizes freely before the ion-conductive high-molecular weight compound is prepared by polymerization. This degree of polymerization is smaller than the degree of polymerization of the ion-conductive high-molecular weight compound prepared by polymerization. Therefore, the thus prepared ion-conductive high-molecular weight compound becomes unstable, so that the intended quality is not obtained. Since the radical scavenger is previously included in the high-molecular weight compound in this embodiment, free polymerization of the high-molecular weight compound is restricted and the prepared ion-conductive high-molecular weight compound i.e. and therefore the battery, can be stable.

In the fourth embodiment, it is preferable to limit the content of the radical scavenger in the battery to 0.1 wt % or smaller. The content of radical scavenger is preferably limited because the hydroxyl group of the radical scavenger has a negative influence on battery characteristics, especially after long-term preservation. A battery with low long-term reliability would be produced if the content of the radical scavenger was larger than 0.1 wt %. Compounds shown in the above formulas (III) and (VI) may be mentioned as the radical scavenger.

The ionic compound may be inorganic ionic salts of Li, Na or K such as $LiClO_4$, $LiBF_4$, $LiAsF_6$, $LiPF_6$, LiI, LiBr, $Li_2B_{10}Cl_{10}$, $LiCF_3SO_3$, $LiCF_3CO_2$, LiSCN, NaI, NaSCN, NaBr, $NaClO_4$, $KClO_4$ and KSCN etc.; quaternary ammonium salts such as $(CH_3)_4NBF_4$, $(CH_3)_4NBr$, $(C_2H_5)_4NClO_4$, $(C_2H_5)_4NI$, $(C_3H_7)_4NBr$, $(n-C_4H_9)_4NClO_4$, $(n-C_4H_9)_4NI$, $(C_2H_5)_4N$-maleate, $(C_2H_5)_4N$-benzoate and $(C_2H_5)_4N$-phthalate etc.; and organic ionic salts such as lithium stearyl sulfonate, sodium octyl sulfonate and lithium dodecylbenzene sulfonate etc., as well as mixtures of these ionic compounds.

Concerning the mixing ratio of these ionic compounds, the ratio of ionic compound to the foregoing high-molecular weight compound is 0.0001 to 5.0 mol/l, preferably 0.005 to 2.0 mol/l. When the quantity of ionic compound is excessively large, the excess ionic compound i.e. inorganic ionic salt for example, does not dissociate but is present as a mixture such as to result in a decrease of ionic conductivity. Further, the proper mixing ratio of ionic compound differs depending on the electrode active material. For example, a ratio around a value offering maximum ion conductivity of electrolyte is preferable for a battery utilizing intercalation of a layer compound, whereas the ratio must be set so as to correspond to a change of ion concentration in the electrolyte caused by charging and discharging for a battery using an electro-conductive polymer utilizing the doping phenomenon as the electrode active material.

There is no special method for adding the ionic compound. A method may be mentioned, for example, in which the ionic compound is dissolved in an organic solvent such as methylethylketone or tetrahydrofuran etc. and mixed uniformly with the high-molecular weight compound, and then removing the organic solvent under reduced pressure.

An organic compound which can dissolve the ionic compound may be included in the ion-conductive high-molecular weight compound. By doing so, the ionic conductivity can be markedly improved without changing the basic skeleton of the ion-conductive high-molecular weight compound.

The organic compound which can dissolve the ionic compound may be: cyclic carbonic esters such as propylene carbonate and ethylene carbonate etc.; cyclic esters such as γ-butyrolactone etc.; ethers such as tetrahydrofuran or its derivative, 1,3-dioxane, 1,2-dimethoxyethane and methyldigraim etc.; nitriles such as acetonitrile and benzonitrile etc.; dioxorane or its derivative; and sulfolane or its derivative etc. for example. Further, these compounds may be used independently or in combination. The material is not limited to those listed above. The mixing ratio and mixing method are discretionary.

A binder may be included as a composition material in at least one of the cathode composite and the anode composite. By doing so, the mechanical strength of the cathode composite and anode composite are remarkably improved.

The binder may be a polymer of high molecular weight ethylene oxide and a random copolymer of high molecular weight ethylene oxide-propylene oxide, etc. It is preferable that the composition ratio (the mole ratio) of ethylene oxide (EO) and propylene oxide (PO) in the random copolymer of high molecular weight ethylene oxide-propylene oxide is in the range of $0 < (PO)/(EO) \leq 5$, however, the ratio is not limited to this.

The binder is prepared by dissolving or dispersing an organic compound in a solvent such as dimethylformamide or xylene etc., for example. As the organic compound, a polymer or copolymer of the following compounds may be mentioned wherein the compounds may be: acrylonitrile, methacrylonitrile, vinylidene fluoride, vinyl fluoride, chloroprene, vinyl pyridine or its derivative, vinylidene chloride, ethylene, propylene, cyclic diene etc. and the cyclic diene may be: cyclopentadiene, 1,3-cyclohexadiene etc., for example.

The binder may be included in the cathode composite and the anode composite the organic compound may be dissolved in a solvent, wherein the electrode active material and the ion-conductive high-molecular weight compound etc. are dispersed therein, and the prepared solution is then used as an application liquid. Alternatively, the electrode active material and the ion-conductive high-molecular weight compound etc. are dispersed in a dispersant liquid comprising the foregoing organic compound and a dispersant to disperse the organic compound, and the prepared solution is then used as an application liquid etc.

Carbon material may be used as the negative active material for the anode composite. Carbon material has a high doping capacity, a low self-discharge rate, an excellent cycle characteristic, and a base-potential very close to that of metallic lithium. Additionally, it does not theoretically produce a complicated chemical reaction at the time of the electrochemical reaction during charging and discharging. Consequently, an extremely excellent charge/discharge cycle characteristic can be obtained when a carbon material is used as the negative active material for the anode composite. In addition, the anode composite becomes extremely stable from the physical and electrochemical points of view.

The negative active material may be alloys including lithium metals such as lithium-aluminum, lithium-lead, lithium-tin, lithium-aluminum-tin, lithium-gallium and Wood's alloys etc., lithium metals and carbon materials etc. These materials may also be used in combination of two or more.

As the carbon material, it is preferable to use materials having X-ray diffraction parameters as listed in Table 1, such as carbon powder prepared by burning anisotropic pitch at a temperature of 2,000° C. or more (with an average grain size of 15 μm or smaller), and carbon fiber etc.

TABLE 1

| Lattice spacing (d002) | 3.35–3.40 Å |
| --- | --- |
| Chrystalline size in a-axis direction | La: 200 Å or more |
| Chrystalline size in c-axis direction | Lc: 200 Å or more |
| True density | 2.00–2.25 g/cm$^3$ |

As the positive active material for use in the cathode composite, the following materials may be mentioned: I-group metallic compounds such as CuO, Cu$_2$O, Ag$_2$O, CuS and CuSO$_4$ etc.; IV-group metallic compounds such as TiS$_2$, SiO$_2$ and SnO etc.; V-group metallic compounds such as V$_2$O$_5$, V$_6$O$_{12}$, VO$_x$, Nb$_2$O$_5$, Bi$_2$O$_3$ and Sb$_2$O$_3$ etc.; VI-group metallic compounds such as CrO$_3$, Cr$_2$O$_3$, MoS$_2$, WO$_3$ and SeO$_2$ etc.; VII-group metallic compounds such as MnO$_2$ and Mn$_2$O$_3$ etc.; VIII-group metallic compounds such as Fe$_2$O$_3$, FeO, Fe$_3$O$_4$, Ni$_2$O$_3$, NiO, CoS$_2$ and CoO etc.; metallic compounds such as lithium-cobalt oxide composite and lithium-manganese oxide composite etc., for example, expressed by the general formulas of Li$_x$MX$_2$ and Li$_x$M-N$_y$X$_2$ (wherein M and N are I- through VIII-group metals and X is a chalcogen compound such as oxygen and sulfur etc.); electro-conductive high-molecular weight compounds such as polypyrrole, polyaniline, polyparaphenylene, polyacetylene and polyacene group materials; and pseudographite structural carbon materials etc. However, the positive active material is not limited to these.

To apply the ion-conductive high-molecular weight compound on the surfaces of the cathode composite and the anode composite, it is preferable to apply the compound as a uniform thickness, for example, by roller coating using an applicator roll, by a doctor blade method, by spin coating or by using a bar coater etc. However, the present invention is not limited to these methods. By using these methods, it is possible to apply the foregoing ion-conductive high-molecular weight compound on the surfaces of the cathode composite and the anode composite in any desired thickness.

Concerning application of the cathode composite and the anode composite on the positive current collector plate and the negative current collector plate respectively, it is preferable to apply the composite as a uniform thickness, for example, by roller coating using an applicator roll, by a doctor blade method, by spin coating or by using a bar coater etc. However, the application method is not limited to these. By using these methods, it is possible to increase the practical surface areas of the electrode active material in contact with the electrolytes and current collector plates in the cathode composite and the anode composite, and it is possible to apply the cathode composite and the anode composite on the positive current collector plate and the negative current collector plate respectively in any desired thickness and shape. In these cases, carbon such as graphite, carbon black and acetylene black etc. (The carbon here has properties quite different from those of the carbon used for the negative active material) and electro-conductive materials such as metallic powder and electro-conductive metal oxide etc. are mixed in the cathode composite and the anode composite as needed, so that electron conductivity may be improved. Further, in order to obtain a uniformerly mixed and dispersed system when manufacturing the cathode composite and the anode composite, several different dispersants and dispersion mediums may be added. In addition, a thickener, an extender and a tackifier may be added.

It is preferable to use aluminum, stainless steel, titanium and copper etc. for the positive current collector plate and to use stainless steel, iron, nickel and copper etc. for the negative current collector plate. However, the material is not limited to these examples.

DETAILED DESCRIPTION OF THE PREFERRED EMBODIMENTS

Embodiment 1

Figure 1:
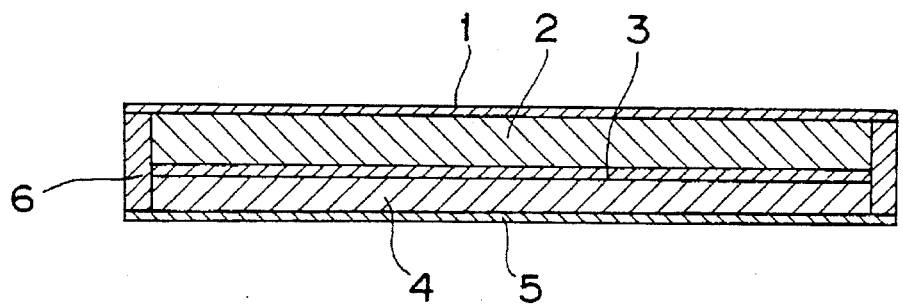
FIG. 1 is a vertical cross section showing a film type primary battery according to an embodiment of the present invention.

FIG. 1 is a vertical cross section showing a film type primary battery according to an embodiment of the present invention. In this figure, 1 is a positive current collector plate, 2 is a cathode composite, 3 is an electrolyte layer, 4 is an anode, 5 is a negative current collector plate and 6 is a sealing material comprising denatured polypropylene. Both current collector plates 1 and 5 serve also as outer packaging.

In the battery of this embodiment, the cathode composite 2 is composed of a positive active material, a conductive material, an ion-conductive high-molecular weight compound and a binder. The anode 4 is composed of a negative active material. The electrolyte layer 3 is composed of an ion-conductive high-molecular weight compound.

The battery of this embodiment was made as follows by steps (a) to (d).

(a) The cathode composite 2 was prepared by first mixing $MnO_2$ forming the positive active material with acetylene black forming the conductive material at a weight ratio of 85 to 15 to form mixture $A_1$. Mixture $A_1$ was then mixed with a xylene solution (2 wt % solution) of a copolymer of ethylene-propylene-1, 3-cyclohexadiene forming the binder at a weight ratio of 2.2 to 2 under an atmosphere of dried inert gas to form mixture $B_1$.

Ten parts by weight of a high-molecular weight mixture prepared by mixing the high-molecular weight compound of formula (XI) with the high-molecular weight compound of formula (XII) at a weight ratio of 4 to 6, were mixed with 1 part by weight $LiClO_4$ and 20 parts by weight of propylene carbonate to form mixture $C_1$. Mixture $B_1$ was mixed with mixture $C_1$ at a weight ratio of 10 to 3 under an atmosphere of dried inert gas to form mixture $D_1$. Mixture $D_1$ was cast by screen coating on the positive current collector plate 1 comprising stainless steel, on the surface of which a conductive carbon film was formed, and irradiated with an electron beam having an electron beam intensity of 8 Mrad under an atmosphere of dried inert gas. The film thickness of the cathode composite 2 formed on the positive current collector plate 1 was 60 μm.

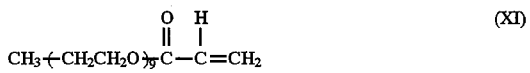

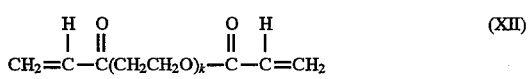

(k = 100 ≈ 110)

(b) The electrolyte layer 3 was formed on the cathode composite 2 by mixing 30 parts by weight of the same high-molecular weight mixture as that of step (a) with 6 parts by weight $LiClO_4$ and 64 parts by weight propylene carbonate to form mixture $E_1$. Mixture $E_1$ was cast of screen coating on the cathode composite 2, and irradiated with an electron beam having an electron beam intensity of 8 Mrad under an atmosphere of dried inert gas in order to be cured. The thickness of the electrolyte layer 3 formed on cathode composite 2 was 25 μm.

In steps (a) and (b), the high-molecular weight compounds of formulas (XI) and (XII) were prepared by esterification. The reaction was carried out by using polyethylene glycol, acrylic acid, sulfuric acid as an acid catalyst, and an organic solvent. The material prepared was neutralized with an alkali metal hydroxide and then washed with an aqueous NaCl solution.

(c) The anode 4 was composed of lithium metal forming the negative active material, and prepared by press bonding to the negative current collector plate 5 comprising stainless steel.

(d) A laminate of electrolyte layer 3, the cathode composite 2 and the positive current collector plate 1 prepared by step (b) and a laminate of anode 4 and the negative current collector plate 5 prepared by step (c) were assembled at electrolyte layer 3 and anode 4. Thereby, the battery shown in FIG. 1 was prepared.

In the battery of this embodiment, the respective content of sulphate ion and chlorine ion in the battery were as follows:

sulphate ion . . . 0.0280 wt % chlorine ion . . . 0.0250 wt %

In order to determine the amounts in this embodiment as listed above, when the high-molecular weight compounds of formulas (XI) and (XII) were prepared, neutralization was done carefully, and washing was done with as small a quantity as possible of aqueous NaCl solution.

The contents of sulphate ion and chlorine ion were measured by centrifuging the battery and extracting at the time of manufacture of the battery. Thereafter, each of the mixtures $D_1$ and $E_1$ were quantitatively measured by ion chromatography and ICP-AES emission spectrochemical analysis. The measured values thus obtained were converted to that of the battery. The battery of this embodiment is composed of the cathode composite 2, the electrolyte layer 3 and the anode 4.

Embodiment 2

This embodiment is different from embodiment 1 only in that para-toluenesulfonic acid was used as the acid catalyst when the high-molecular weight compounds of formulas (XI) and (XII) were prepared.

In the battery of this embodiment, the respective contents of para-toluenesulfonate ion and chlorine ion in the battery were as follows:

para-toluenesulfonate ion . . . 0.0210 wt % chlorine ion . . . 0.0240 wt %

The content was determined and measured as above for embodiment 1.

Comparison Example 1

The battery of this comparison example is different from that of embodiment 1 only in that the respective contents of sulphate ion and chlorine ion in the battery were as follows:

sulphate ion . . . 0.2250 wt % chlorine ion . . . 0.1820 wt %

Test 1

Discharge tests were done on the batteries of embodiments 1 and 2 and comparison example 1 to examine the respective discharge characteristics at the outset (just after manufacture of the battery) and the respective discharge characteristics after long-term preservation. The electrode surface area could be varied depending on the manufacturing process, however, it was set to 100 cm² in these tests.

The discharge tests were performed at a temperature of 25° C., and a load of 3 kΩ.

The period of long-term preservation was 100 days at 60° C.

Figure 2:
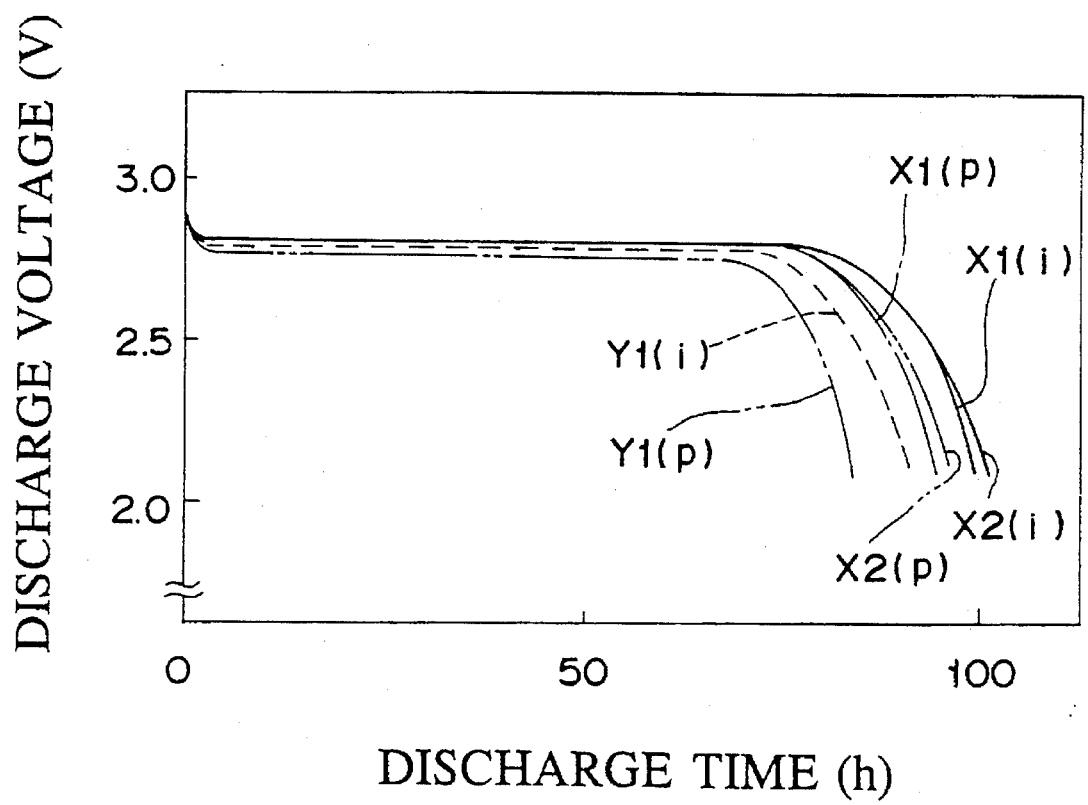
FIG. 2 is a diagram showing the discharge characteristics at the initial stage and the discharge characteristics after long-term preservation for the respective batteries of embodiments 1 and 2 and comparison example 1.

FIG. 2 shows discharge characteristics at the outset and discharge characteristics after long-term preservation. In FIG. 2, X1(i) and X2(i) indicate the respective discharge characteristics at the outset of the batteries of embodiments 1 and 2, X1(p) and X2(p) indicate the respective discharge characteristics after long-term preservation of the batteries of embodiments 1 and 2, Y1(i) indicates the discharge characteristic at the outset of the battery of comparison example 1, and Y1(p) indicates the discharge characteristic after long-term preservation of the battery of comparison example 1. Further, the abscissa represents the discharge time (hour) and the ordinate represents the discharge voltage (v).

As can be seen from FIG. 2, the batteries of embodiments 1 and 2 have excellent discharge characteristics when fresh and after long-term preservation as compared to the battery of comparison example 1.

Further, 40 cells of the respective batteries of embodiments 1 and 2 and comparison example 1 were examined to check for the number of expanded cells after long-term preservation. The number was zero for the batteries of embodiments 1 and 2, but it was three for the battery of comparison example 1. In other words, no expansion was seen in the battery of embodiments 1 and 2.

Figure 3:
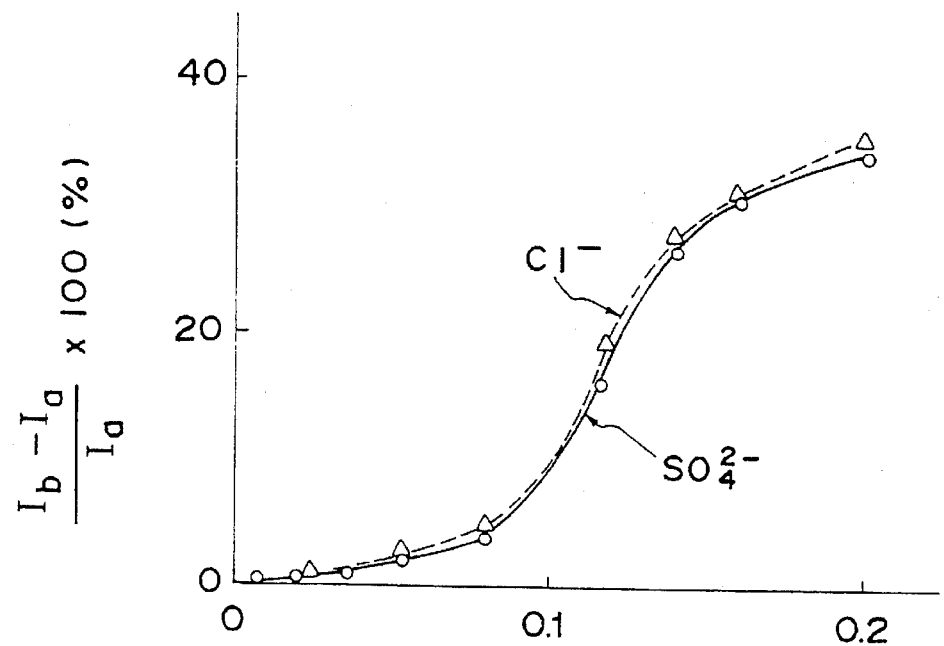
FIG. 3 is a diagram showing the relationship in a primary battery between the rising rate of impedance inside the battery after preservation for 100 days at 60° C. and the content of sulphate ion and chlorine ion.

Further, the relationship between the rising rate of impedance inside the battery after preservation for 100 days at 60° C. and the contents of both the sulphate ion and chlorine ion was examined. FIG. 3 shows the results. In FIG. 3, $I_a$ indicates the impedance inside the battery before preservation, and $I_b$ indicates the impedance inside the battery after preservation. The rising rate of impedance is calculated by $(I_b-I_a)/I_a \times 100(\%)$. As shown in FIG. 3, the rising rate of impedance inside the battery changes largely at a point where the contents of both the sulphate ion and chlorine ion are about 0.1 wt %. The rising rate is extremely small at 0.1 wt % or less. That is, when the contents of both ions are 0.1 wt % or less, a decrease of battery efficiency caused by the rise of impedance inside the battery is controlled.

Embodiment 3

This embodiment relates to a film type secondary battery which is an example of the battery of this invention. The fundamental structure of this battery is the same as that of the battery shown in FIG. 1, however, 4 is an anode composite.

In the battery of this embodiment, the cathode composite 2 is composed of a positive active material, a conductive material, an ion-conductive high-molecular weight compound and a binder. The anode composite 4 is composed of a negative active material, an ion-conductive high-molecular weight compound and a binder. The electrolyte layer 3 is composed of an ion-conductive high-molecular weight compound.

The battery of this embodiment was made as follows by the following steps (a) to (e).

(a) The cathode composite 2 was prepared by first mixing $LiCoO_2$ forming the positive active material with acetylene black forming the conductive material at a weight ratio of 85 to 15 to form mixture $A_3$. Mixture $A_3$ was mixed with a dimethylformamide solution (2 wt % solution) of polyacrylonitrile forming the binder at a weight ratio of 2.4 to 2 under an atmosphere of dried inert gas to form mixture $B_3$.

Ten parts by weight of a high-molecular weight mixture, prepared by mixing the high-molecular weight compound of formula (XI) with the high-molecular weight compound of formula (XII) at a weight ratio of 3.5 to 6.5, were mixed with 0.02 part by weight of a principal-chain straight-chain type polyethylene oxide, 1 part by weight $LiBF_4$, 10 parts by weight 1,2-dimethoxyethane and 10 parts by weight γ-butyrolactone to form mixture $C_3$. Mixture $B_3$ was then mixed with mixture $C_3$ at a weight ratio of 10 to 3 under an atmosphere of dried inert gas form mixture $D_3$. Mixture $D_3$ was cast by screen coating on the positive current collector plate 1 comprising aluminum, on the surface of which a conductive carbon film was formed, and irradiated and cured with an electron beam having an electron beam intensity of 12 Mrad under an atmosphere of dried inert gas. The film thickness of the cathode composite 2 formed on the positive current collector plate 1 was 60 μm.

(b) The electrolyte layer 3 was formed on the cathode composite 2 by mixing 30 parts by weight of the same high-molecular weight mixture as that of step (a) with 0.06 part by weight of a principal-chain straight-chain type polyethylene oxide, 6 parts by weight $LiBF_4$, 32 parts by weight 1,2-dimethoxyethane and 32 weight parts γ-butyrolactone to form mixture $E_3$. Mixture $E_3$ was cast by screen coating on the cathode composite 2 under an atmosphere of dried inert gas, and irradiated and cured with an electron beam having an electron beam intensity of 8 Mrad under an atmosphere of dried inert gas. The film thickness of the electrolyte layer 3 formed on the cathode composite 2 was 25 μm.

(c) The anode composite 4 was formed by mixing carbon powder forming the negative active material with a xylene solution (2 wt % solution) of a copolymer of ethylene-propylene-cyclopentadiene forming the binder at a weight ratio of 2 to 5 under an atmosphere of dried inert gas to form mixture $F_3$. Ten parts by weight of a high-molecular weight mixture, prepared by mixing the high-molecular weight compound of formula (XI) with the high-molecular weight compound of formula (XII) at a weight ratio of 3.2 to 6.8, were mixed with 1 part by weight $LiBF_4$, 10 parts by weight 1,2-dimethoxyethane and 10 parts by weight γ-butyrolactone to form mixture $G_3$. Mixture $F_3$ was mixed with mixture $G_3$ at a weight ratio of 8 to 2 under an atmosphere of dried inert gas to form mixture $H_3$. Mixture $H_3$ was cast by screen coating on the negative current collector plate 5 comprising stainless steel, and irradiated with an electron beam having an electron beam intensity of 12 Mrad under an atmosphere of dried inert gas in order to be cured. The film thickness of the anode composite 4 formed on the negative current collector plate 5 was 30 μm.

(d) The electrolyte layer 3 was formed on the anode composite 4 by preparing mixture $E_3$ the same as in step (b). Mixture $E_3$ was cast by screen coating on the anode composite 4 under an atmosphere of dried inert gas, and irradiated with an electron beam having an electron beam intensity of 8 Mrad under an atmosphere of dried inert gas in order to be cured. The film thickness of the electrolyte layer 3 formed on the anode composite 4 was 25 μm.

In steps (a) to (d), the method of manufacturing the high-molecular weight compounds of formulas (XI) and (XII) and the apparatus for the manufacture were the same as for embodiment 1. That is, the high-molecular weight compounds of formulas (XI) and (XII) were prepared in such a way that esterification was carried out by using polyethylene glycol, acrylic acid, sulfuric acid as an acid catalyst, and an organic solvent. The prepared material was neutralized by using an alkali metal hydroxide and then washed by using an aqueous NaCl solution. In this embodiment, when the high-molecular weight compounds of formulas (XI) and (XII) were prepared, neutralization was strictly controlled, and washing was done with as small a quantity as possible of aqueous NaCl solution.

(e) A laminate of electrolyte layer 3, the cathode composite 2 and the positive current collector plate 1 prepared by step (b) and a laminate of electrolyte layer 3, the anode composite 4 and the negative current collector plate 5 prepared by steps (d) were assembled at the respective electrolyte layers 3.

In the battery of this embodiment, the respective content of sulphate ion and chlorine ion in the battery were as follows:

sulphate ion . . . 0.0300 wt % chlorine ion . . . 0.0220 wt %

The content of sulphate ion and chlorine ion were measured in the same manner as in embodiment 1. That is, the battery was centrifuged and extracted after manufacture. Thereafter, each of the mixtures $D_3$, $E_3$ and $H_3$ were measured quantitatively by ion chromatography and ICP-AES emission spectrochemical analysis. The values measured were converted to that of the battery contents. The battery contents of this embodiment composed of the cathode composite 2, the electrolyte layer 3, and the anode composite 4.

Embodiment 4

This embodiment differs from embodiment 3 only in that, para-toluenesulfonic acid was used as the acid catalyst when the high-molecular weight compounds of formulas (XI) and (XII) were prepared.

In the battery of this embodiment, the respective content of para-toluenesulfonate ion and chlorine ion in the battery were as follows:

para-toluenesulfonate ion . . . 0.0260 wt % chlorine ion . . . 0.0240 wt %

The content was determined as above and measured the same as of embodiment 3.

Comparison Example 2

The battery of this comparison example is different from that of embodiment 3 only in that the respective content of sulphate ion and chlorine ion in the battery were as follows:

sulphate ion . . . 0.2330 wt % chlorine ion . . . 0.1890 wt %

Test 2

Charge/discharge cycle tests were done on the batteries of embodiments 3 and 4 and comparison example 2 to examine the respective charge/discharge cycle characteristics of the batteries when fresh (just after manufacture of the battery) and after long-term preservation. The electrode surface area could be varied depending on the manufacturing process, however, it was set to 100 $cm^2$ in these tests.

The charge/discharge cycle tests were performed at a temperature of 25° C., a constant-current constant-voltage charge of 50 μA/$cm^2$, a constant-current discharge of 50 μA/$cm^2$, a charge end voltage of 4.1 V and a discharge end voltage of 2.7 V.

The period of long-term preservation was 100 days at 60° C.

Figure 4:
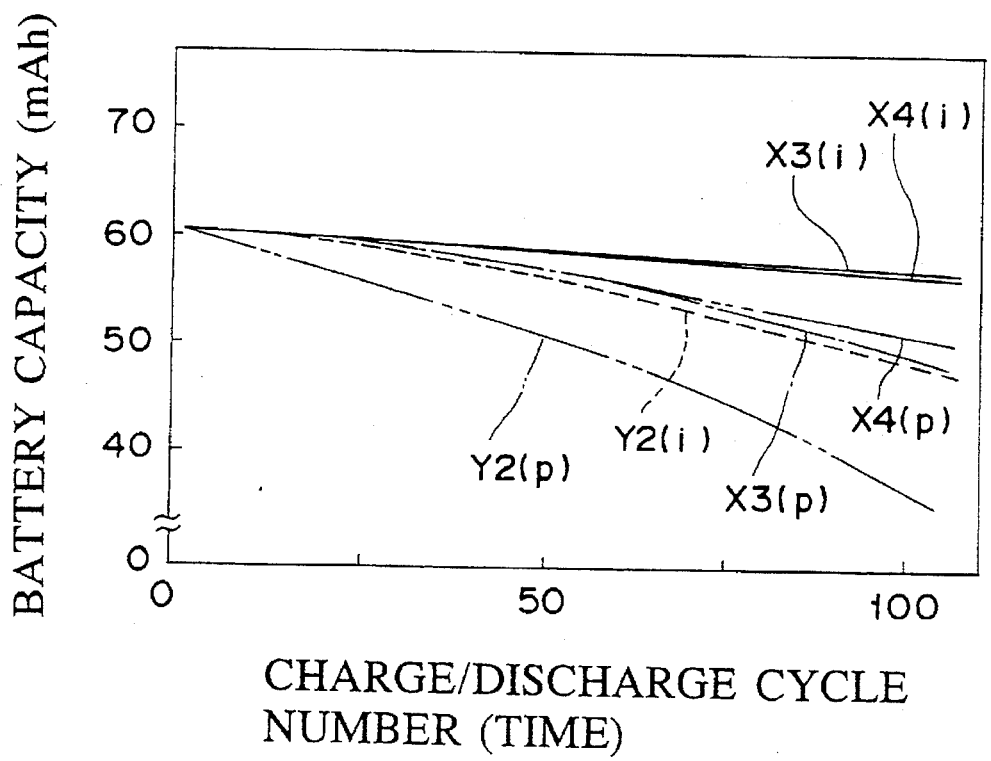
FIG. 4 is a diagram showing charge/discharge cycle characteristics at an initial stage and charge/discharge cycle characteristics after long-term preservation for the respective batteries of embodiments 3 and 4 and comparison example 2.

FIG. 4 shows charge/discharge cycle characteristics of the batteries when fresh and after long-term preservation. In FIG. 4, X3(i) and X4(i) indicate the respective charge/discharge cycle characteristics of the batteries of embodiments 3 and 4 when fresh, X3(p) and X4(p) indicate the respective charge/discharge cycle characteristics after long-term preservation of the batteries of embodiments 3 and 4, Y2(i) indicates a charge/discharge cycle characteristic of the battery of comparison example 2 when fresh, and Y2(p) indicates a charge/discharge cycle characteristic after long-term preservation of the battery of comparison example 2. Further, the abscissa represents the charge/discharge cycle number (time) and the ordinate represents the battery capacity (mAh).

As can be seen from FIG. 4, the batteries of embodiments 3 and 4 have excellent charge/discharge cycle characteristics when fresh and after long-term preservation as compared with the battery of comparison example 2.

Further, 30 cells of the batteries of embodiments 3 and 4 and comparison example 2 were examined to check for the number of expanded cells after long-term preservation. The number was zero for the batteries of embodiments 3 and 4, but it was five for the battery of comparison example 2. In other words, no expansion was seen in the batteries of embodiments 3 and 4.

Further, the relationship between the rising rate of impedance inside the battery after preservation for 100 days at 60° C. and the content of both sulphate ion and chlorine ion was examined. When both the contents of sulphate ion and chlorine ion were 0.1 wt % or less, the rising rate was extremely small.

Embodiment 5

This embodiment is different from embodiment 1 only in that the content of polyethylene glycol in the battery was 0.0290 wt %. In this embodiment, in order to set the content as above, when the high-molecular weight compounds of formulas (XI) and (XII) were prepared, a slight excess of acrylic acid was used so that the polyethylene glycol reacts fully. The content of polyethylene glycol was measured by subjecting the battery was to centrifugation and extraction at the time of manufacture. Thereafter, each of the mixtures were measured quantitatively before casting by liquid chromatography and titration analysis of the hydrolysis reaction. The titration analysis was carried out by titrating excessive acetic acid with KOH after acetylation with the acetylation reagent (acetic anhydride-pyridine).

Comparison Example 3

The battery of this comparison example is different from that of embodiment 5 only in that, the content of polyethylene glycol in the battery was 0.1720 wt %.

Test 3

Discharge tests were done on the batteries of embodiment 5 and comparison example 3 in the same manner as test 1 in order to examine the respective discharge characteristics when fresh and after long-term preservation.

Figure 5:
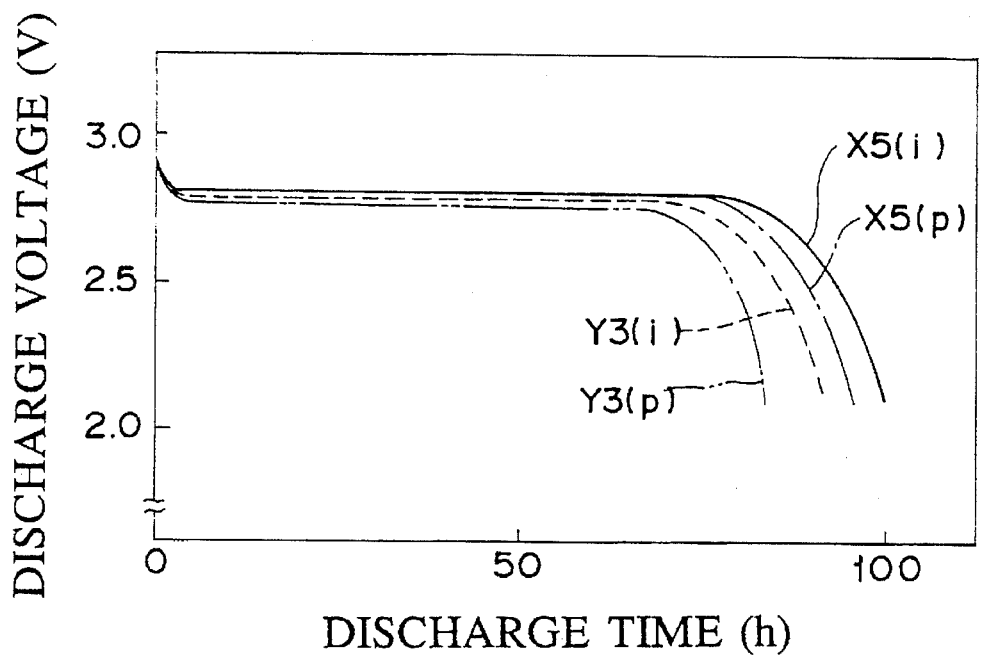
FIG. 5 is a diagram showing the discharge characteristics at an initial stage and the discharge characteristics after long-term preservation for the respective batteries of embodiment 5 and comparison example 3.

FIG. 5 shows discharge characteristics of the batteries when fresh and after long-term preservation. In FIG. 5, X5(i) indicates the discharge characteristic of the fresh battery of embodiment 5, X5(p) indicates the discharge characteristic after long-term preservation of the battery of embodiment 5, Y3(i) indicates the discharge characteristic of the fresh battery of comparison example 3, and Y3(p) indicates the discharge characteristic after long-term preservation of the battery of comparison example 3. Further, the abscissa represents the discharge time (hour) and the ordinate represents the discharge voltage (V).

As can be seen from FIG. 5, the battery of embodiment 5 has excellent discharge characteristics both at initial stage and after long-term preservation as compared with the battery of comparison example 3.

Further, 40 cells of the respective batteries of embodiment 5 and comparison example 3 were examined to check for the fraction of defective cells after manufacture of the battery. The number of defective cells was zero for the battery of embodiment 5, but it was six for the battery of comparison example 3. In other words, no defective cells were seen in the battery of embodiment 5. This may be attributable to the fact that, in the battery of comparison example 3, before the thin film comprising the ion-conductive high-molecular weight compound was formed, the high-molecular weight compounds of formulas (XI) and (XII) were naturally polymerized to form a thin film which has weak mechanical strength, so that short-circuiting occurs easily.

Figure 6:
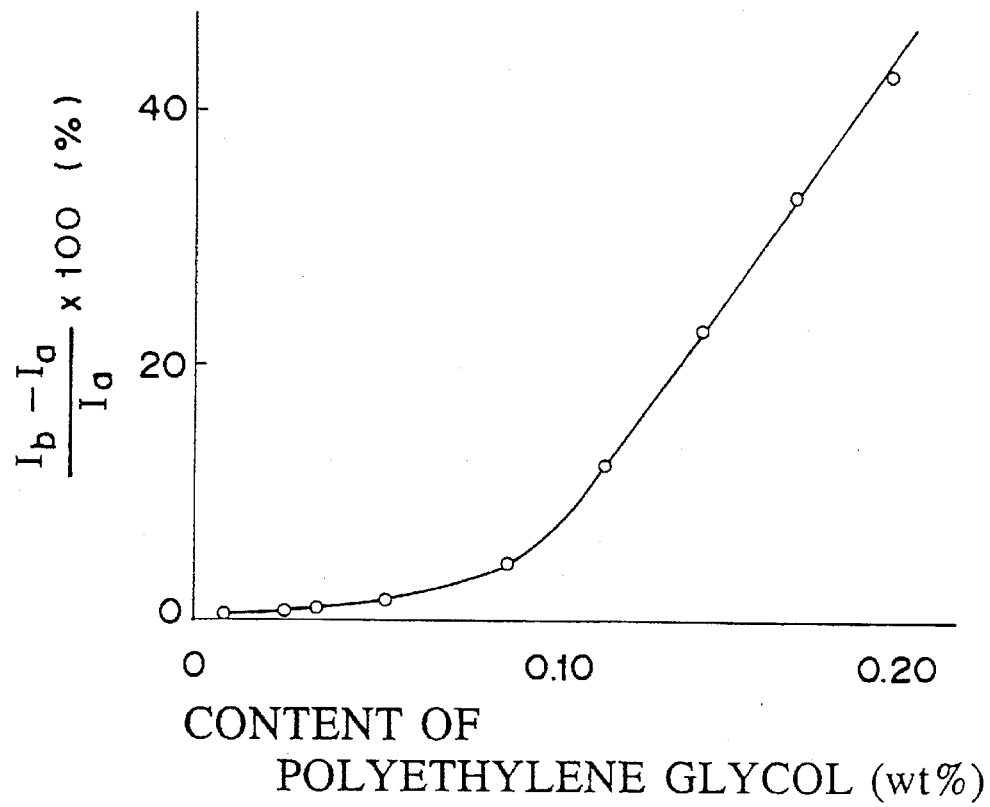
FIG. 6 is a diagram showing the relationship in a primary battery between the rising rate of impedance inside the battery after preservation for 100 days at 60° C. and the content of polyethylene glycol.

Further, the relationship between the rising rate of impedance inside the battery after preservation for 100 days at 60° C. and the content of polyethylene glycol was examined. FIG. 6 shows the results. In FIG. 6, $I_a$, $I_b$, and the rising rate of impedance are similar to those of FIG. 3. As shown in FIG. 6, the rising rate of impedance inside the battery changes largely at a border point where the content of polyethylene glycol is about 0.1 wt %. The rising rate of impedance was extremely small at 0.1 wt % or less. That is, when the content of polyethylene glycol was 0.1 wt % or less, a decrease of battery efficiency caused by the rise of impedance inside the battery was limited.

Embodiment 6

This embodiment is different from embodiment 3 only in that the content of polyethylene glycol in the battery was 0.0280 wt %. The apparatus for setting the content as above and the manner of measuring the content of polyethylene glycol are the same as for those of embodiment 5.

Comparison Example 4

The battery of this comparison example is different from that of embodiment 6 only in that the content of polyethylene glycol in the battery was 0.1620 wt %.

Test 4

Charge/discharge cycle tests were done on the batteries of embodiment 6 and comparison example 4 in the same manner as test 2 to examine the respective charge/discharge cycle characteristics when the batteries were fresh and after long-term preservation.

Figure 7:
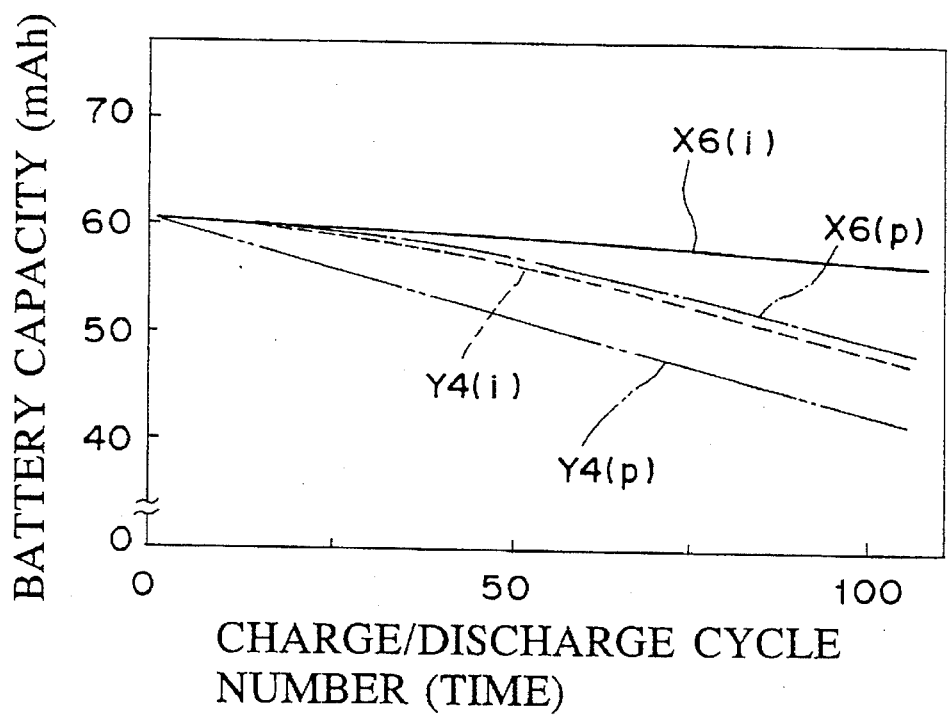
FIG. 7 is a diagram showing charge/discharge cycle characteristics at an initial stage and charge/discharge cycle characteristics after long-term preservation for the respective batteries of embodiment 6 and comparison example 4.

FIG. 7 shows charge/discharge cycle characteristics when the batteries were fresh and after long-term preservation. In FIG. 7, X6(i) indicates the charge/discharge cycle characteristic of the fresh battery of embodiment 6, X6(p) indicates the charge/discharge cycle characteristic after long-term preservation of the battery of embodiment 6, Y4(i) indicates the charge/discharge cycle characteristic of the fresh battery of comparison example 4, and Y4(p) indicates the charge/discharge cycle characteristic after long-term preservation of the battery of comparison example 4. Further, the abscissa represents the charge/discharge cycle number (time) and the ordinate represents the battery capacity (mAh).

As can be seen from FIG. 7, the battery of embodiment 6 has excellent charge/discharge cycle characteristics both when fresh and after long-term preservation as compared with the battery of comparison example 4.

Further, 30 cells of the respective batteries of embodiment 6 and comparison example 4 were examined to check for the fraction of defective cells after manufacture of the battery. The number of defective cells was zero for the battery of embodiment 6, but it was four for the battery of comparison example 4. In other words, no defective cells were observed in the case of the battery of embodiment 6. This may be attributable to the fact that, in the battery of comparison example 4, before the thin film comprising the ion-conductive high-molecular weight compound was formed, the high-molecular weight compounds of formulas (XI) and (XII) were naturally polymerized to form a thin film which has weak mechanical strength, so that short circuiting occurs easily.

Further, the relationship between the rising rate of impedance inside the battery after preservation for 100 days at 60°

Figure 8:
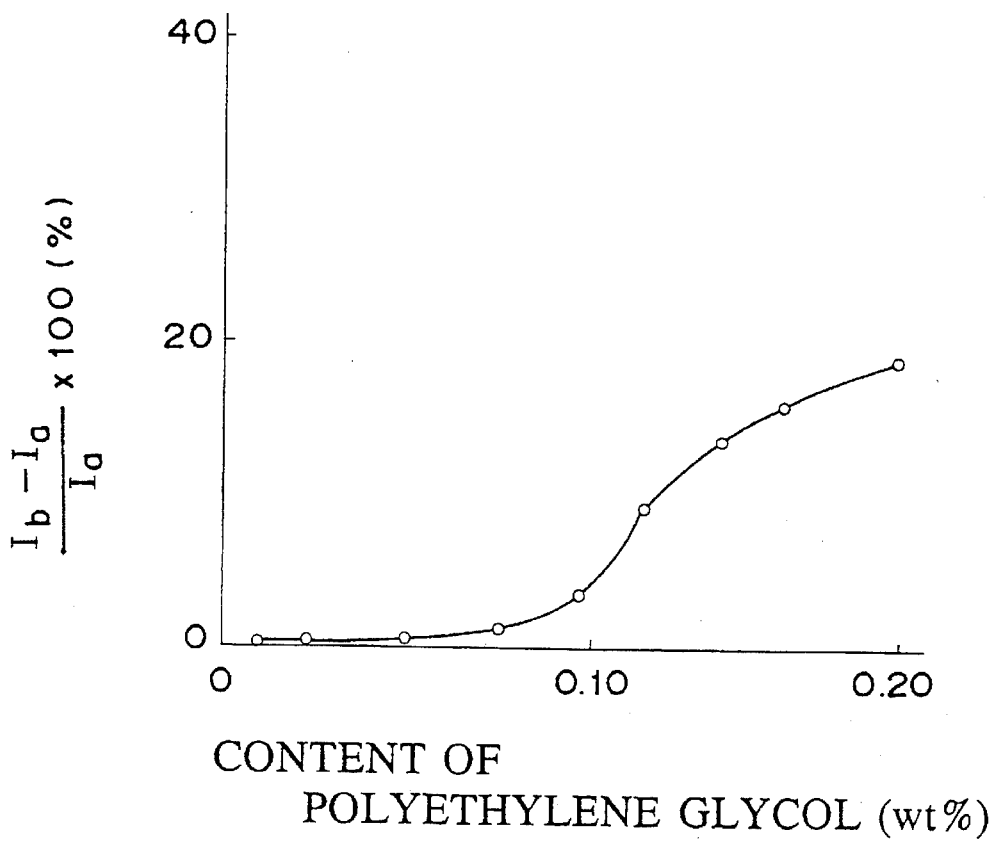
FIG. 8 is a diagram showing the relationship in a secondary battery between the rising rate of impedance inside the battery after preservation for 100 days at 60° C. and the content of polyethylene glycol.

C. and the content of polyethylene glycol was examined. FIG. 8 shows the results. In FIG. 8, $I_a$, $I_b$ and the rising rate of impedance correspond to those of FIG. 3. As shown in FIG. 8, the rising rate of impedance inside the battery changes largely at a border point where the content of polyethylene glycol is about 0.1 wt %. The rising rate of the impedance was extremely small at 0.1 wt % or less. That is, when the content of polyethylene glycol was 0.1 wt % or less, a decrease in battery efficiency caused by the rise of impedance inside the battery was limited.

Embodiment 7

This embodiment is different from embodiment 1 only in that the content of acrylic acid in the battery was 0.0190 wt %. In this embodiment, in order to set the content of acrylic acid as above, when the high-molecular weight compounds of formulas (XI) and (XII) were prepared, excess polyethylene glycol was used so that the acrylic acid would react fully. The content of acrylic acid was measured by subjecting the battery to centrifugation and extraction at the time of manufacture of the battery. Thereafter, each of the mixtures were quantitatively measured before casting by liquid chromatography and titration analysis. The titration analysis was done by titrating with KOH-ethanol solution, for example, using bromothymol blue as an indicator.

Comparison Example 5

The battery of this comparison example is different from that of embodiment 7 only in that, the content of acrylic acid in the battery was 0.1220 wt %.

Test 5

Discharge tests were done on the batteries of embodiment 7 and comparison example 5 in the same manner as test 1 to examine the respective discharge characteristics at the initial stage and after long-term preservation.

Figure 9:
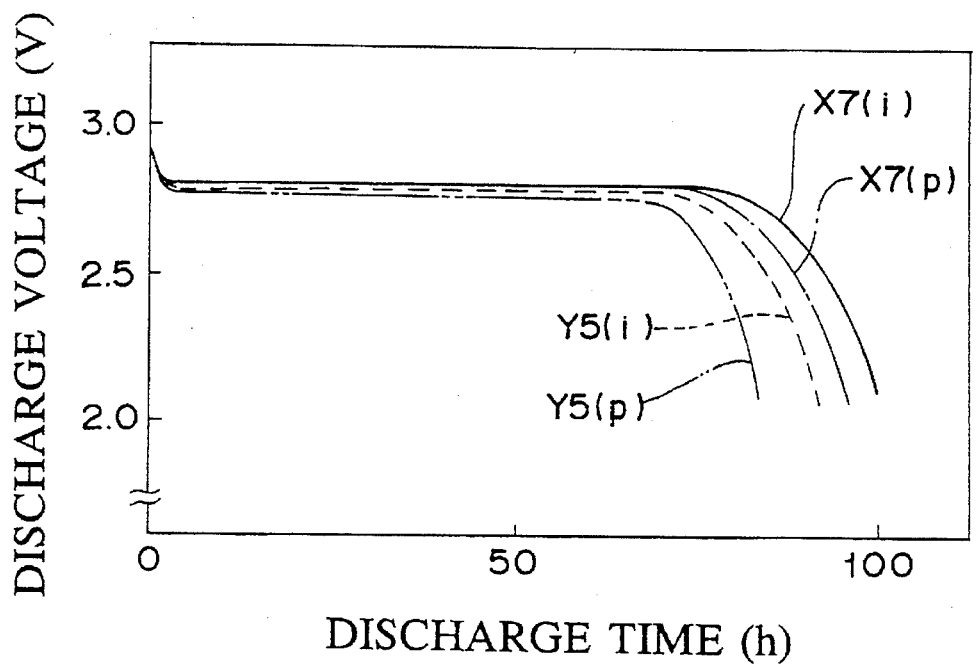
FIG. 9 is a diagram showing discharge characteristics at an initial stage and discharge characteristics after long-term preservation for the respective batteries of embodiment 7 and comparison example 5.

FIG. 9 shows discharge characteristics of the fresh battery and after long-term preservation. In FIG. 9, X7(i) indicates the discharge characteristic of the fresh battery of embodiment 7, X7(p) indicates the discharge characteristic after long-term preservation of the battery of embodiment 7, Y5(i) indicates the discharge characteristic of the fresh battery of comparison example 5, and Y5(p) indicates the discharge characteristic after long-term preservation of the battery of comparison example 5. Further, the abscissa represents the discharge time (hours) and the ordinate represents the discharge voltage (V).

As can be seen from FIG. 9, the battery of embodiment 7 has excellent discharge characteristics both when fresh and after long-term preservation as compared to the battery of comparison example 5.

Further, 40 cells of the respective batteries of embodiment 7 and comparison example 5 were examined to check for the fraction of defective cells after manufacture of the battery. The number of defective cells was zero for the battery of embodiment 7, but it was five for the battery of comparison example 5. In other words, no defect was seen in the case of the battery of embodiment 7. This may be attributable to the fact that, in the battery of comparison example 5, before the thin film comprising the ion-conductive high-molecular weight compound was formed, the high-molecular weight compounds of formulas (XI) and (XII) were naturally polymerized to form a thin film which has weak mechanical strength, so that short-circuiting occurs easily.

Figure 10:
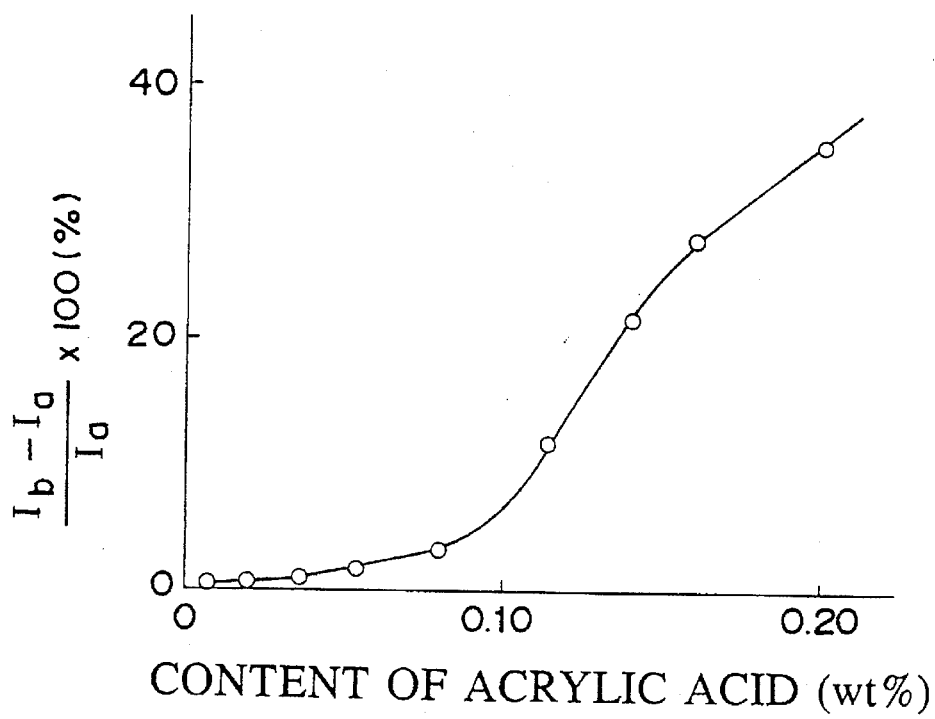
FIG. 10 is a diagram showing the relationship in a primary battery between the rising rate of impedance inside the battery after preservation for 100 days at 60° C. and the content of acrylic acid.

Further, the relationship between the rising rate of impedance inside the battery after preservation for 100 days at 60° C. and the content of acrylic acid was examined. FIG. 10 shows the results. In FIG. 10, $I_a$, $I_b$ and the rising rate of impedance correspond to those of FIG. 3. As shown in FIG. 10, the rising rate of impedance inside the battery changes largely at a border point where the content of acrylic acid is about 0.1 wt %. The rising rate of impedance was extremely small at 0.1 wt % or less. That is, when the content of acrylic acid was 0.1 wt % or less, a decrease in battery efficiency caused by the rise of impedance inside the battery was limited.

In embodiment 7 and comparison example 5, when methacrylic acid was used in place of acrylic acid, the same results were obtained.

Embodiment 8

This embodiment is different from embodiment 3 only in that, the content of the acrylic acid in the battery was 0.0180 wt %. The apparatus contrivance for setting the content of acrylic acid as above and the manner of measuring the content of acrylic acid are the same as for embodiment 7.

Comparison Example 6

The battery of this comparison example is different from that of embodiment 8 only in that, the content of acrylic acid in the battery was 0.1410 wt %.

Test 6

Charge/discharge cycle tests were done on the batteries of embodiment 8 and comparison example 6 in the same manner as test 2 to examine the respective charge/discharge cycle characteristics when the batteries were fresh and after long-term preservation.

Figure 11:
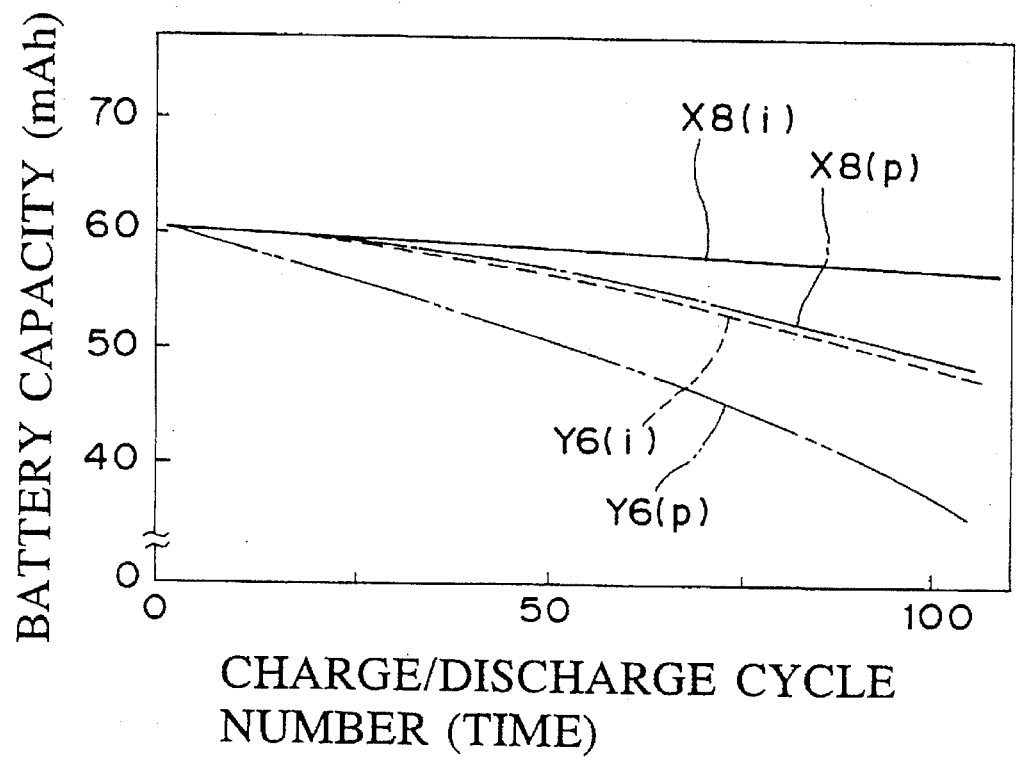
FIG. 11 is a diagram showing charge/discharge cycle characteristics at initial stage and charge/discharge cycle characteristics after long-term preservation for the respective batteries of embodiment 8 and comparison example 6.

FIG. 11 shows charge/discharge cycle characteristics of the fresh battery and of the battery after long-term preservation. In FIG. 11, X8(i) indicates the charge/discharge cycle characteristic of the fresh battery of embodiment 8, X8(p) indicates the charge/discharge cycle characteristic after long-term preservation of the battery of embodiment 8, Y6(i) indicates the charge/discharge cycle characteristic of the fresh battery of comparison example 6, and Y6(p) indicates the charge/discharge cycle characteristic after long-term preservation of the battery of comparison example 6. Further, the abscissa represents the charge/discharge cycle number (time) and the ordinate represents the battery capacity (mAh).

As can be seen from FIG. 11, the battery of embodiment 8 has excellent charge/discharge cycle characteristics both when fresh and after long-term preservation as compared with the battery of comparison example 6.

Further, 30 cells of the respective batteries of embodiment 8 and comparison example 6 were examined to check for the fraction of defective cells after manufacture of the battery. The number of defective cells was zero for the battery of embodiment 8, but it was six for the battery of comparison example 6. In other words, no defective cells were seen in the case of the battery of embodiment 8. This may be attributable to the fact that, in the battery of comparison example 6, before the thin film comprising the ion-conductive high-molecular weight compound was formed, the high-molecular weight compounds of formulas (XI) and (XII) were naturally polymerized to form a thin film which has weak mechanical strength, so that short-circuiting occurs easily.

Figure 12:
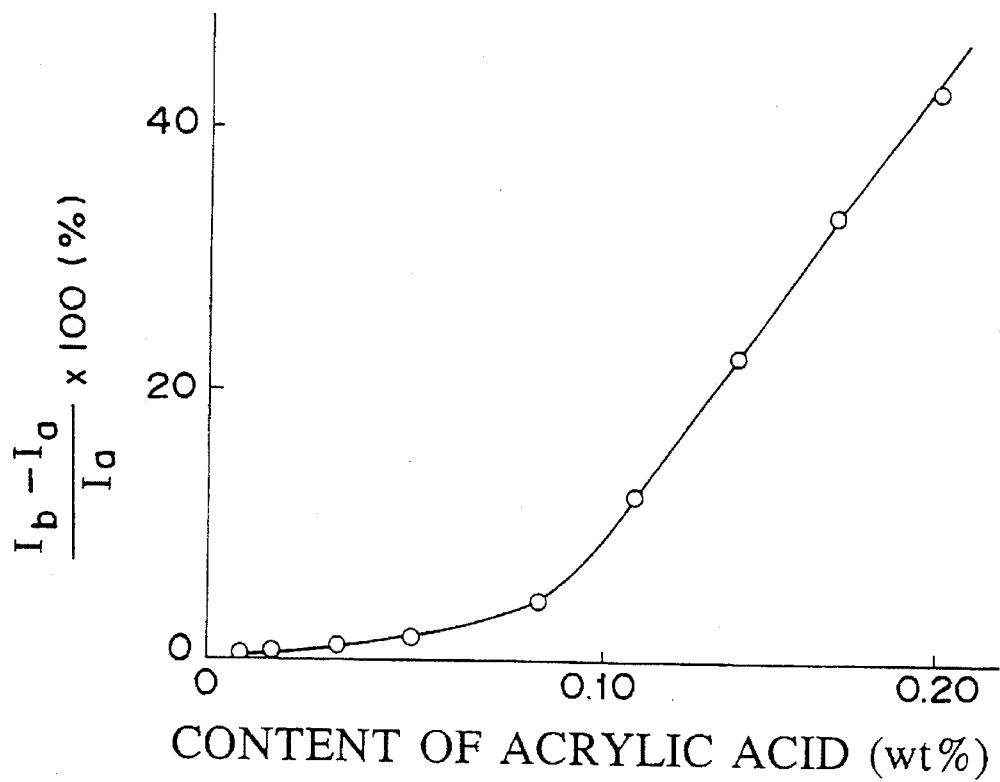
FIG. 12 is a diagram showing the relationship in a secondary battery between the rising rate of impedance inside the battery after preservation for 100 days at 60° C. and the content of acrylic acid.

Further, the relationship between the rate of rising impedance inside the battery after preservation for 100 days at 60° C. and the content of acrylic acid was examined. FIG. 12 shows the results. In FIG. 12, $I_a$, $I_b$ and the rising rate of impedance correspond to those of FIG. 3. As shown in FIG. 12, the rising rate of the impedance inside the battery changes largely at a border point where the content of acrylic acid is about 0.1 wt %. The rising rate of impedance was extremely small at 0.1 wt % or less. That is, when the content of acrylic acid was 0.1 wt % or less, a drop in battery efficiency caused by the rise of impedance inside the battery was limited.

In embodiment 8 and comparison example 6, when methacrylic acid was used in place of acrylic acid, the same results were obtained.

Embodiment 9

This embodiment relates to a film type primary battery which is an embodiment of the present invention. The fundamental structure of the battery is the same as that of the battery shown in FIG. 1.

The battery of this embodiment was made up as follows.

(a) The cathode composite 2 was prepared by first mixing $MnO_2$ forming the positive active material with acetylene black forming the conductive material at a weight ratio of 85 to 15 under an atmosphere of dried inert gas to form mixture $A_9$. Mixture $A_9$ was mixed with a xylene solution (a 2 wt % solution) of a copolymer of ethylene-propylene-1,3-cyclohexadiene forming the binder at a weight ratio of 2.2 to 2 under an atmosphere of dried inert gas to form mixture $B_9$.

Ten parts by weight of a high-molecular weight mixture, prepared by mixing the high-molecular weight compound of formula (XI) with the high-molecular weight compound of formula (XII) at a weight ratio of 4 to 6, were mixed with 1 part by weight $LiClO_4$ and 20 parts by weight propylene carbonate to form mixture $C_9$. Mixture $B_9$ was mixed with mixture $C_9$ at a weight ratio of 20 to 3 under an atmosphere of dried inert gas to form mixture $D_9$. Mixture $D_9$ was cast by screen coating on the positive current collector plate 1 made of stainless steel, on the surface of which a conductive carbon film was formed, and irradiated with an electron beam having an electron beam intensity of 8 Mrad so as to be cured after the xylene was completely removed under an atmosphere of dried inert gas. The film thickness of cathode composite 2 formed on the positive current collector plate 1 was 60 μm.

(b) The anode 4 was composed of lithium metal forming the negative active material, and formed by being press bonded to the negative current collector plate 5 made of stainless steel.

(c) The electrolyte layer 3 was formed on the anode 4 by mixing 30 parts by weight of the same high-molecular weight mixture as that of step (a) with 6 parts by weight $LiClO_4$ and 64 parts by weight propylene carbonate to form mixture $E_9$. Mixture $E_9$ was cast by screen coating on the anode 4, and irradiated with an electron beam having an electron beam intensity of 8 Mrad under an atmosphere of dried inert gas in order to be cured. The thickness of the electrolyte layer 3 formed on the anode 4 was 25 μm.

In steps (a) and (c), the high-molecular weight compounds of formulas (XI) and (XII) were prepared by esterification with polyethylene glycol, acrylic acid, sulfuric acid forming an acid catalyst and an organic solvent, and thereafter neutralized with NaOH, and then washed with an aqueous NaCl solution.

(d) A laminate of the electrolyte layer 3, the anode 4 and the negative current collector plate 5 prepared by (c) and a laminate of the cathode composite 2 and the positive current collector plate 1 prepared by step (a) were assembled at the cathode composite 2 and the electrolyte layer 3 to prepare the battery shown in FIG. 1.

In the battery of this embodiment, the respective content of alkali metal and multivalent ions in the battery are shown in Table 2.

TABLE 2

| $Na^+$ | $K^+$ | $Ca^{2+}$ | $Fe^{2+/3+}$ |
|---|---|---|---|
| 0.005 wt % | 0.002 wt % | 0.001 wt % | 0.001 wt % |
| $Ni^{3+}$ | $Co^{3+}$ | $Cr^{3+}$ | |
| 0.001 wt % | 0.001 wt % | 0.001 wt % | |

In order to achieve the ion contents as above, in this embodiment, when the high-molecular weight compounds of formulas (XI) and (XII) were prepared, neutralization with NaOH was strictly controlled, and washing was done with as small a quantity as possible of an aqueous solution of NaCl and with a large quantity of distilled water.

The amount of each of the above ions was measured by subjecting the battery to centrifugation and extraction at the time of manufacture of the battery. Thereafter, each of the mixtures $D_9$ and $E_9$ were quantitatively measured by the atomic absorption analysis ICP-AES emission spectrochemical analysis, etc. The measured values obtained were converted to those of the battery components. The battery of this embodiment is made up of the cathode composite 2, the electrolyte layer 3, and the anode 4.

Comparison Example 7

The battery of this comparison example is different from that of embodiment 9 only in that, the respective content of alkali metal and multivalent ions in the battery are shown in Table 3.

TABLE 3

| $Na^+$ | $K^+$ | $Ca^{2+}$ | $Fe^{2+/3+}$ |
|---|---|---|---|
| 0.110 wt % | 0.122 wt % | 0.130 wt % | 0.150 wt % |
| $Ni^{3+}$ | $Co^{3+}$ | $Cr^{3+}$ | |
| 0.120 wt % | 0.110 wt % | 0.115 wt % | |

Test 7

Discharge tests were done on the batteries of embodiment 9 and comparison example 7 in the same manner as test 1 to examine the respective discharge characteristics of the batteries at the initial stage and after long-term preservation.

Figure 13:
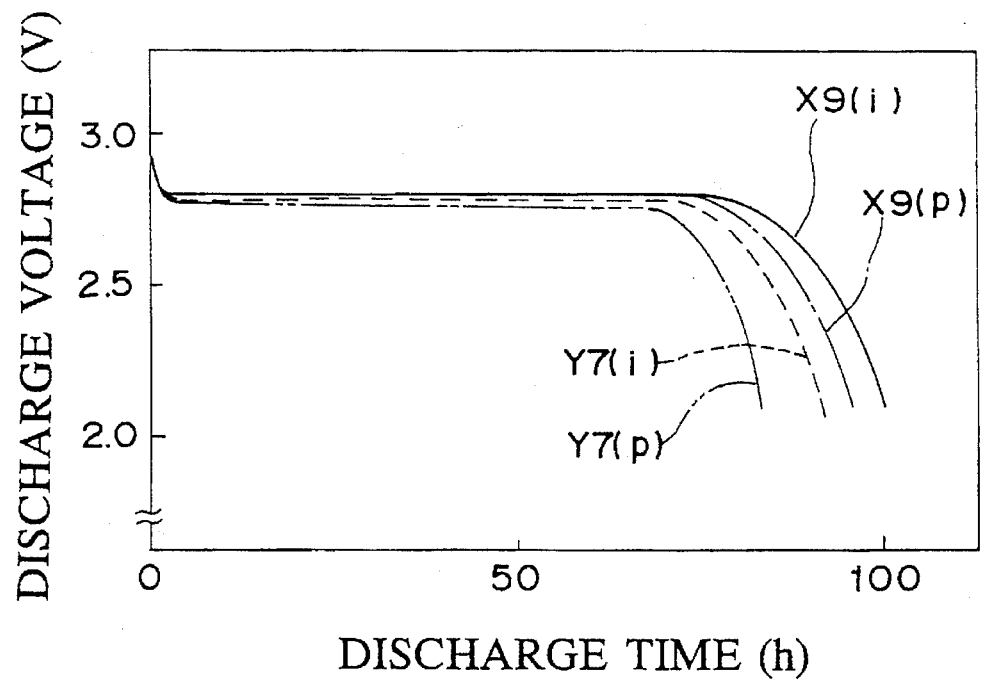
FIG. 13 is a diagram showing discharge characteristics at an initial stage and discharge characteristics after long-term preservation for the respective batteries of embodiment 9 and comparison example 7.

FIG. 13 shows the discharge characteristics at the initial stage and after long-term preservation. In FIG. 13, X9(i) indicates the discharge characteristic at the initial stage of the battery of embodiment 9, X9(p) indicates the discharge characteristic after long-term preservation of the battery of embodiment 9, Y7(i) indicates the discharge characteristic at the initial stage of the battery of comparison example 7, and Y7(p) indicates the discharge characteristic after long-term preservation of the battery of comparison example 7. Further, the abscissa represents the discharge time (hour) and the ordinate represents the discharge voltage (V).

As can be seen from FIG. 13, the battery of embodiment 9 has excellent discharge characteristics at both the initial stage and after long-term preservation as compared with the battery of comparison example 7.

Further, 40 cells of the respective batteries of embodiment 9 and comparison example 7 were examined to check the rate of occurrence of a short circuit after long-term preservation. The number of short-circuit cells was zero for the battery of embodiment 9, but it was three for the battery of comparison example 7.

Figure 14:
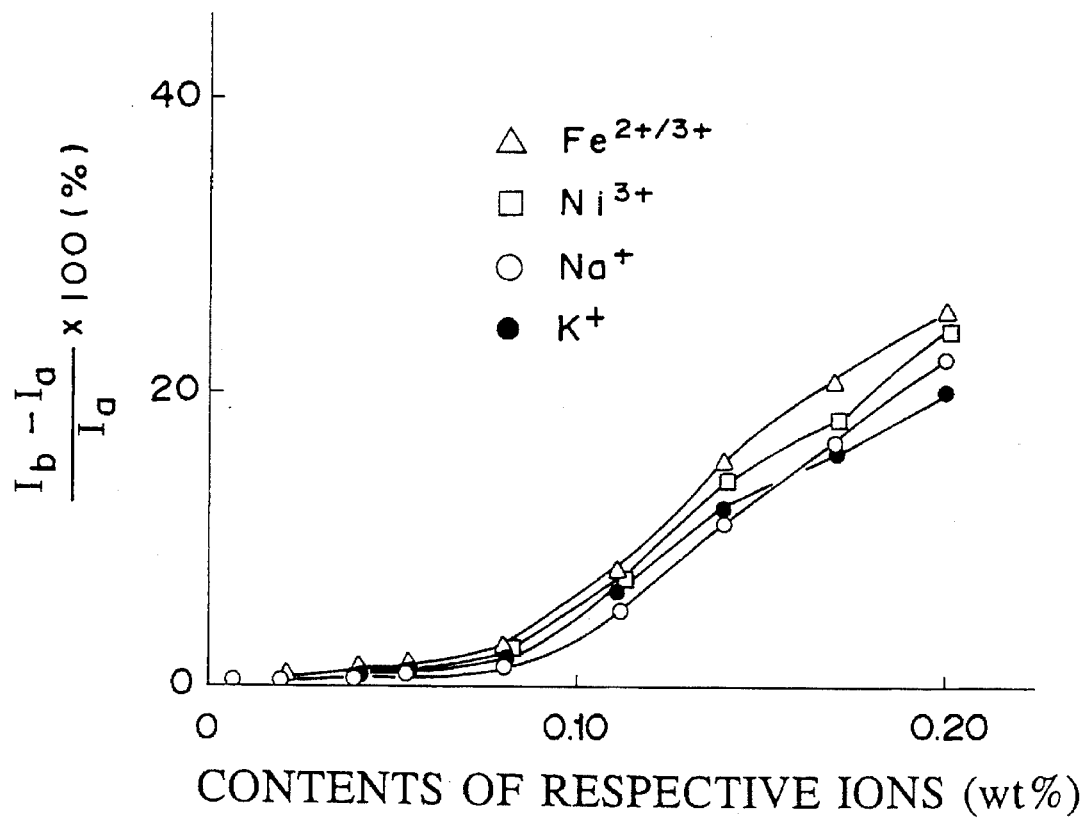
FIG. 14 is a diagram showing the relationship in a primary battery between the rising rate of impedance inside the battery after preservation for 100 days at 60° C. and the content of alkali metal or multivalent ions.

Further, the relationship between the rising rate of impedance inside the battery after preservation for 100 days at 60° C. and the content of $Fe^{2+/3+}$, $Ni^{3+}$, $Na^+$ and $K^+$ ions was examined. FIG. 14 shows the result. In FIG. 14, $I_a$, $I_b$ and the rising rate of impedance corresponds to those of FIG. 3. As shown in FIG. 14, the rising rate of impedance inside the battery changes largely at a border point where the content of the above respective ions are about 0.1 wt %. The rising rate of impedance was extremely small at 0.1 wt % or less. That is, when the content of the above respective ions were 0.1 wt % or less, a drop in battery efficiency caused by the rise of impedance inside the battery was limited.

Embodiment 10

This embodiment relates to a film type secondary battery which is an embodiment of the battery of the present invention. The fundamental structure of the battery is same as that of the battery shown in FIG. 1, however, 4 is an anode composite.

The battery of this embodiment was made by the following steps:

(a) The cathode composite 2 was prepared by first mixing $LiCoO_2$ forming the positive active material with acetylene black forming the conductive material under an atmosphere of dried inert gas with a weight ratio of 85 to 15 to form mixture $A_{10}$. Mixture $A_{10}$ was mixed with a dimethylformamide solution (2 wt % solution) of polyacrylonitrile forming the binder at a weight ratio of 2.4 to 2 under an atmosphere of dried inert gas to form mixture $B_{10}$.

10 parts by weight of a high-molecular weight mixture, prepared by mixing the high-molecular weight compound of formula (XI) with the high-molecular weight compound of formula (XII) at a weight ratio of 3.5 to 6.5, were mixed with 1 part by weight $LiBF_4$, 10 parts by weight 1,2-dimethoxyethane and 10 parts by weight γ-butyrolactone to form mixture $C_{10}$. Mixture $B_{10}$ was mixed with mixture $C_{10}$ at a weight ratio of 17 to 3 under an atmosphere of dried inert gas to form mixture $D_{10}$. Mixture $D_{10}$ was cast by screen coating on the positive current collector plate 1 comprising aluminum on the surface of which a conductive carbon film was formed, and irradiated with an electron beam having an electron beam intensity of 12 Mrad so as to be cured after the dimethylformamide was completely removed under an atmosphere of dried inert gas. The film thickness of the cathode composite 2 formed on the positive current collector plate 1 was 60 μm.

(b) The anode composite 4 was formed by mixing carbon powder forming the negative active material with a xylene solution (2 wt % solution) of a copolymer of ethylene-propylene-cyclopentadiene forming the binder at a weight ratio of 2 to 5 under an atmosphere of dried inert gas to form mixture $F_{10}$. 10 parts by weight of a high-molecular weight mixture, prepared by mixing the high-molecular weight compound of formula (XI) to the high-molecular weight compound of formula (XII) at a weight ratio of 3.2 to 6.8, were mixed with 1 part by weight $LiBF_4$, 10 parts by weight 1,2-dimethoxyethane and 10 parts by weight γ-butyrolactone mixture $G_{10}$. Mixture $F_{10}$ was mixed with mixture $G_{10}$ at a weight ratio of 18 to 2 under an atmosphere of dried inert gas to form mixture $H_{10}$. Mixture $H_{10}$ was cast of screen coating on the negative current collector plate 5 comprising copper, and irradiated with an electron beam having an electron beam intensity of 12 Mrad in order to be cured after the xylene was completely removed under an atmosphere of dried inert gas. The film thickness of the anode composite 4 formed on the negative current collector plate 5 was 30 μm.

(c) The electrolyte layer 3 was formed on the cathode composite 2 by first mixing 30 parts by weight of the same high-molecular weight mixture as that used in step (a) were mixed with 6 parts by weight $LiBF_4$, 32 parts by weight 1,2-dimethoxyethane and 32 parts by weight γ-butyrolactone to form mixture $E_{10}$. Mixture $E_{10}$ was cast by screen coating on the cathode composite 2, and irradiated with an electron beam having an electron beam intensity of 8 Mrad under an atmosphere of dried inert gas in order to be cured. The film thickness of the electrolyte layer 3 formed on the cathode composite 2 was 45 μm.

In the steps (a) to (c), the manufacturing method for the high-molecular weight compounds of formulas (XI) and (XII) and the apparatus used for the manufacture were the same as for that of embodiment 9. That is, the high-molecular weight compounds of formulas (XI) and (XII) were prepared by an esterification reaction with polyethylene glycol, acrylic acid, sulfuric acid forming an acid catalyst and organic solvent, and thereafter neutralized with NaOH and then washed with an aqueous NaCl solution. In this embodiment, when the high-molecular weight compounds of formulas (XI) and (XII) were prepared, neutralization with NaOH was done carefully and washing was done with as small a quantity as possible of an aqueous NaCl solution and with a large quantity of distilled water.

(d) A laminate of the anode composite 4 and the negative current collector plate 5 prepared by step (b) and a laminate of the electrolyte layer 3, the cathode composite 2 and the positive current collector plate 1 prepared by step (c) were assembled at the anode composite 4 and the electrolyte layer 3.

The respective content of alkali metal and multivalent ions in the battery of this embodiment are shown in Table 4.

TABLE 4

| $Na^+$ | $K^+$ | $Ca^{2+}$ | $Fe^{2+/3+}$ |
|---|---|---|---|
| 0.005 wt % | 0.002 wt % | 0.001 wt % | 0.001 wt % |
| $Ni^{3+}$ | $Co^{3+}$ | $Cr^{3+}$ | |
| 0.001 wt % | 0.001 wt % | 0.001 wt % | |

The content of the above respective ions were measured in the same manner as in embodiment 9. That is, the battery was centrifuged and extracted at the time of manufacture of the battery. Thereafter, each of the mixtures $D_{10}$, $E_{10}$ and $H_{10}$ were quantitatively measured by atomic absorption analysis, ICP-AES emission spectrochemical analysis, etc. The values thus obtained were converted to that of the battery contents. The battery contents of this embodiment comprises cathode composite 2, electrolyte layer 3, and anode composite 4.

Comparison Example 8

The battery of this comparison example is different from that of embodiment 10 only in that, the respective content of alkali metal and multivalent ions in the battery were as shown in Table 5.

TABLE 5

| $Na^+$ | $K^+$ | $Ca^{2+}$ | $Fe^{2+/3+}$ |
|---|---|---|---|
| 0.110 wt % | 0.122 wt % | 0.130 wt % | 0.150 wt % |
| $Ni^{3+}$ | $Co^{3+}$ | $Cr^{3+}$ | |
| 0.120 wt % | 0.110 wt % | 0.115 wt % | |

Test 8

Charge/discharge cycle tests were done on the batteries of embodiment 10 and comparison example 8 to examine the respective charge/discharge cycle characteristics when fresh and after long-term preservation. The electrode surface area could be varied depending on the manufacturing process, however, it was set to 100 cm² for these tests.

The charge/discharge cycle test were run at a temperature of 25° C., a constant-current constant-voltage charge of 100 μA/cm², a constant-current discharge of 100 μA/cm², a charge end voltage of 4.2 V and discharge end voltage of 2.7 V.

The period of long-term preservation was 100 days at 60° C.

Figure 15:
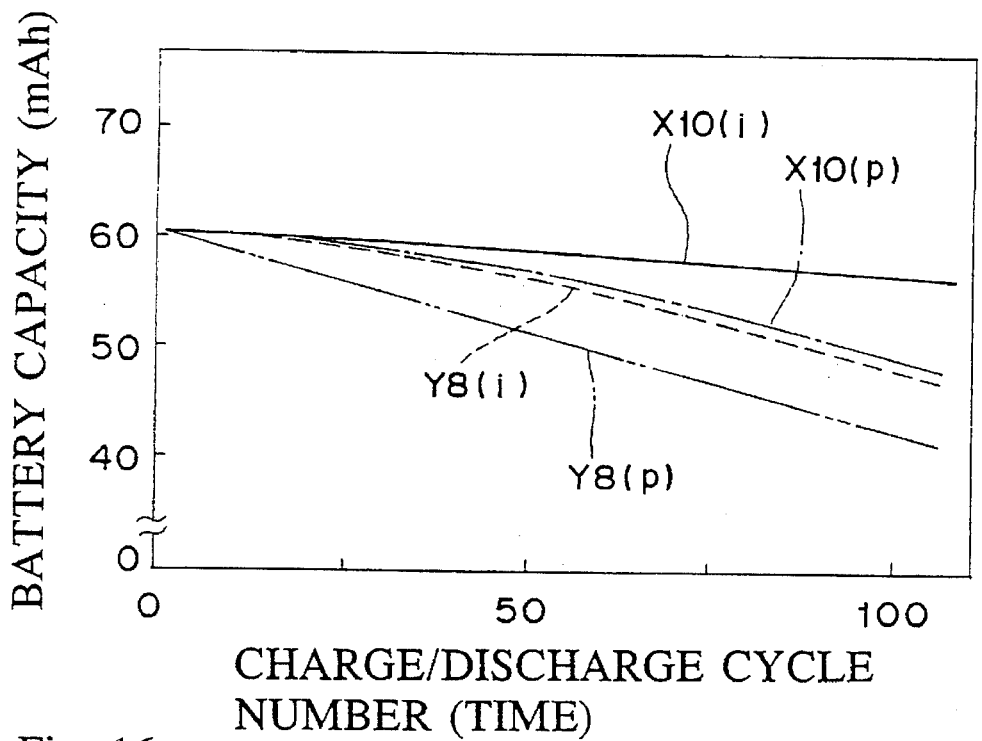
FIG. 15 is a diagram showing charge/discharge cycle characteristics at an initial stage and charge/discharge cycle characteristics after long-term preservation for the respective batteries of embodiment 10 and comparison example 8.

FIG. 15 shows the charge/discharge cycle characteristics of the batteries when fresh and after long-term preservation. In FIG. 15, X10(i) indicates charge/discharge cycle characteristic of the fresh battery of embodiment 10, X10(p) indicates the charge/discharge cycle characteristic after long-term preservation of the battery of embodiment 10, Y8(i) indicates the charge/discharge cycle characteristic of the fresh battery of comparison example 8, and Y8(p) indicates the charge/discharge cycle characteristic after long-term preservation of the battery of comparison example 8. Further, the abscissa represents a charge/discharge cycle number (time) and the ordinate represents the battery capacity (mAh).

As can be seen from FIG. 15, the battery of embodiment has excellent charge/discharge cycle characteristics both when fresh and after long-term preservation as compared with the battery of comparison example 8.

Further, 15 cells of the respective batteries of embodiment 10 and comparison example 8 were examined to check the rate of occurrence of a short circuit during the charge/discharge cycle. The number of short-circuited cells was zero for the battery of embodiment 10, but it was two for the battery of comparison example 8.

Figure 16:
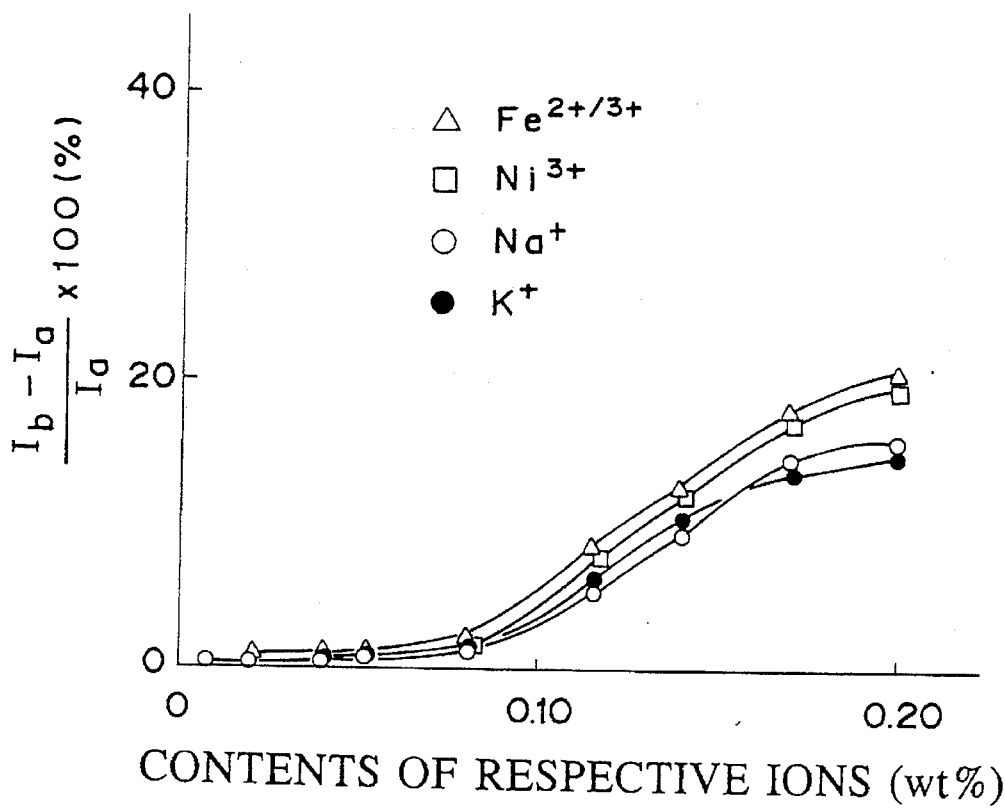
FIG. 16 is a diagram showing the relationship in a secondary battery between the rising rate of impedance inside the battery after preservation for 100 days at 60° C. and the content of alkali metal or multivalent ions.

Further, the relation between the rising rate of impedance inside the battery after preservation for 100 days at 60° C. and the content of $Fe^{2+/3+}$, $Ni^{3+}$, $Na^+$ and $K^+$ were examined. FIG. 16 shows the results. In FIG. 16, $I_a$, $I_b$ and the rising rate of impedance correspond to those of FIG. 3. As shown in FIG. 16, the rising rate of impedance inside of the battery changes largely at a border point where the contents of the above respective ions are about 0.1 wt %. The rising rate of impedance was extremely small when the content of these ions was 0.1 wt % or less. That is, when the content of the above respective ions were 0.1 wt % or less, a decrease in battery efficiency caused by the rise of impedance inside the battery was limited.

Embodiment 11

This embodiment relates to a film type primary battery which is an embodiment of the battery of the present invention. The fundamental structure of the battery is the same as that of the battery shown in FIG. 1.

The battery of this embodiment was made by following steps (a) to (d).

(a) The cathode composite 2 was prepared by first mixing $MnO_2$ forming the positive active material with acetylene black forming the conductive material at a weight ratio of 85 to 15 to form mixture $A_{11}$. Mixture $A_{11}$ was then mixed with a xylene solution (2 wt % solution) of a copolymer of ethylene-propylene-1, 3-cyclohexadiene forming the binder at a weight ratio of 2.2 to 2 under an atmosphere of dried inert gas to form mixture $B_{11}$.

10 parts by weight of a high-molecular weight mixture, prepared by mixing the high-molecular weight compound of formula (XI) with the high-molecular weight compound of formula (XII) at a weight ratio of 4 to 6, were mixed with 1 part by weight $LiClO_4$ and 20 parts by weight propylene carbonate to form mixture $C_{11}$. Mixture $B_{11}$ was mixed with mixture $C_{11}$ at a weight ratio of 10 to 3 under an atmosphere of dried inert gas to form mixture $D_{11}$. Mixture $D_{11}$ was cast by screen coating on the positive current collector plate 1 comprising stainless steel, on the surface of which a conductive carbon film was formed, and irradiated with an electron beam having an electron beam intensity of 8 Mrad under an atmosphere of dried inert gas in order to be cured. The film thickness of the cathode composite 2 formed on the positive current collector plate 1 was 60 μm.

(b) The electrolyte layer 3 was formed on the cathode composite 2 by mixing 30 parts by weight of the same high-molecular weight mixture as that used in step (a) were mixed with 6 parts by weight $LiClO_4$ and 64 parts by weight propylene carbonate to form mixture $E_{11}$. Mixture $E_{11}$ was cast by screen coating on the cathode composite 2, and irradiated with an electron beam having an electron beam intensity of 8 Mrad under an atmosphere of dried inert gas in order to be cured. The thickness of the electrolyte layer 3 formed on the cathode composite 2 was 25 μm.

In the steps (a) and (b), the high-molecular weight compounds of formulas (XI) and (XII) were prepared by esterification using polyethylene glycol, acrylic acid, sulfuric acid forming an acid catalyst, the compounds of formulas (XIII) and (XIV) forming the radical scavenger and an organic solvent; and the prepared material was neutralized by using alkali metal hydroxide and then washed by using an aqueous NaCl solution.

(XIII)

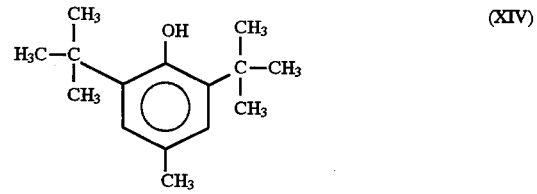

(XIV)

(c) The anode 4 comprised lithium metal forming the negative active material, and was formed by being press bonded to the negative current collector plate 5 comprising stainless steel.

(d) A laminate of the electrolyte layer 3, the cathode composite 2 and the positive current collector plate 1 prepared by step (b) and a laminate of the anode 4 and the negative current collector plate 5 prepared by step (c) were brought into contact with each other at the electrolyte layer 3 and the anode 4. Thereby, the battery which had the same structure as that of the battery shown in FIG. 1 was prepared.

In the battery of this embodiment, the of the compounds of formulas (XIII) and (XIV) in the battery were both 0.010 wt %. In order to set the content as above in this embodiment, the quantity of the high-molecular weight compounds of formulas (XIII) and (XIV) to be added were determined in advance.

The content of the compounds of formulas (XIII) and (XIV), that is the radical scavenger, were measured by subjecting the battery to centrifugation and extraction at the time of manufacture of the battery. Thereafter, each of the mixtures $D_{11}$ and $E_{11}$ were quantitatively measured by colorimetric determination redox titration etc. In the colorimetric determination method, for example, a nitroso compound was measured quantitatively by adding sodium sulfite. The values thus obtained were converted to that of the battery contents. The battery content of this embodiment comprises the cathode composite 2, the electrolyte layer 3, and the anode 4.

Comparison Example 9

The battery of this comparison example is different from that of embodiment 11 only in that, the radical scavenger was not used for manufacture of the battery. Therefore, the battery of this comparison example contains no radical scavenger.

Test 9

Discharge tests were done on the battery of embodiment 11 and comparison example 9 in the same manner as test 1 to examine the respective discharge characteristics of the batteries when fresh and after long-term preservation.

Figure 17:
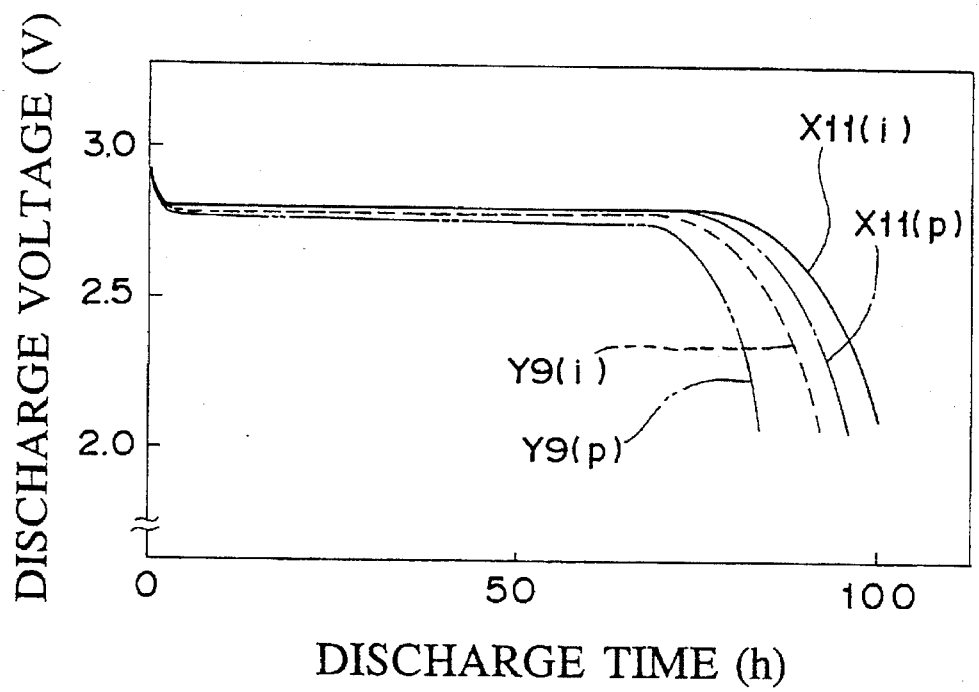
FIG. 17 is a diagram showing discharge characteristics at an initial stage and discharge characteristics after long-term preservation for the respective batteries of embodiment 11 and comparison example 9.

FIG. 17 shows the discharge characteristics of the battery when fresh and after long-term preservation. In FIG. 17, X11(i) indicates the discharge characteristic of the fresh battery of embodiment 11, X11(p) indicates the discharge characteristic after long-term preservation of the battery of embodiment 11, Y9(i) indicates the discharge characteristic of the fresh battery of comparison example 9, and Y9(p) indicates the discharge characteristic after long-term preservation of the battery of comparison example 9. Further, the abscissa represents the discharge time (hour) and the ordinate represents the discharge voltage (V).

As can be seen from FIG. 17, the battery of embodiment 11 has excellent discharge characteristics both when fresh and after long-term preservation as compared with the battery of comparison example 9.

Further, 40 cells of the respective batteries of embodiment 11 and comparison example 9 were examined to check for the fraction of defective cells at the time of manufacture of the battery. The number of defective cells was zero for the battery of embodiment 11, but it was eight for the battery of comparison example 9. This may be attributable to the fact that, in the battery of comparison example 9, before the thin film comprising the ion-conductive high-molecular weight compound was formed, the high-molecular weight compounds of formulas (XI) and (XII) were naturally polymerized to form a thin film which has weak mechanical strength, so that short-circuiting occurs easily.

Further, the relationship between the rising rate of impedance inside the battery after preservation for 100 days at 60° C. and the content of radical scavenger was examined. When the content of radical scavenger was 0.1 wt % or less, the rising rate of impedance was extremely small.

Embodiment 12

This embodiment relates to a film type secondary battery which is an embodiment of the battery of the present invention. The fundamental structure of the battery is the same as that of the battery shown in FIG. 1, however, 4 is an anode composite.

The battery of this embodiment was made by following steps (a) to (e).

(a) The cathode composite 2 was prepared by first mixing $LiCoO_2$ forming the positive active material with acetylene black forming the conductive material at a weight ratio of 85 to 15 to form mixture $A_{12}$. Mixture $A_{12}$ was mixed with a dimethylformamide solution (2 wt % solution) of polyacrylonitrile forming the binder at a weight ratio of 2.4 to 2 under an atmosphere of dried inert gas to form mixture $B_{12}$.

10 parts by weight of a high-molecular weight mixture, prepared by mixing the high-molecular weight compound of formula (XI) to the high-molecular weight compound of formula (XII) at a weight ratio of 3.5 to 6.5, were mixed with 0.02 part by weight of a principal-chain straight-chain polyethylene oxide, 1 part by weight $LiBF_4$, 10 parts by weight 1,2-dimethoxyethane and 10 parts by weight γ-butyrolactone to form mixture $C_{12}$. Mixture $B_{12}$ was then mixed with mixture $C_{12}$ at a weight ratio of 10 to 3 under an atmosphere of dried inert gas to form mixture $D_{12}$. Mixture $D_{12}$ was cast by screen coating on the positive current collector plate 1 comprising aluminum, on the surface of which a conductive carbon film was formed, and irradiated with an electron beam having an electron beam intensity of 12 Mrad under an atmosphere of dried inert gas in order to be cured. The film thickness of the cathode composite 2 formed on the positive current collector plate 1 was 60 μm.

(b) The electrolyte layer 3 was formed on the cathode composite 2 by mixing 30 parts by weight of the same high-molecular weight mixture as that of step (a) with 0.06 part by weight of principal-chain straight-chain polyethylene oxide, 6 parts by weight $LiBF_4$, 32 parts by weight 1,2-dimethoxyethane and 32 parts by weight γ-butyrolactone mixture $E_{12}$. Mixture $E_{12}$ was cast by screen coating on the cathode composite 2 under an atmosphere of dried inert gas, and irradiated with an electron beam having an electron beam intensity of 8 Mrad under an atmosphere of dried inert gas in order to be cured. The film thickness of the electrolyte layer 3 formed on the cathode composite 2 was 25 μm.

(c) The anode composite 4 was prepared by mixing carbon powder forming the negative active material with a toluene solution (2 wt % solution) of a copolymer of ethylene-propylene-cyclopentadiene forming the binder at a weight ratio of 2 to 5 under an atmosphere of dried inert gas to form mixture $F_{12}$. 10 parts by weight of a high-molecular weight mixture, prepared by mixing the high-molecular weight compound of formula (XI) with the high-molecular weight compound of formula (XII) at a weight ratio of 3.2 to 6.8, were mixed with 1 part by weight $LiBF_4$, 10 parts by weight 1,2-dimethoxyethane and 10 parts by weight γ-butyrolactone to form mixture $G_{12}$. Mixture $F_{12}$ was mixed with mixture $G_{12}$ at a weight ratio of 8 to 2 under an atmosphere of dried inert gas to form mixture $H_{12}$. Mixture $H_{12}$ was cast by screen coating on the negative current collector plate 5 comprising stainless steel, and irradiated with an electron beam having an electron beam intensity of 12 Mrad under an atmosphere of dried inert gas in order to be cured. The film thickness of the anode composite 4 formed on the negative current collector plate 5 was 30 μm.

(d) The electrolyte layer 3 was formed on the anode composite 4 by mixing 30 parts by weight of the same high-molecular weight mixture as that of step (a) with 6 parts by weight $LiBF_4$, 32 parts by weight 1,2-dimethoxyethane and 32 parts by weight γ-butyrolactone to form mixture $I_{12}$. Mixture $I_{12}$ was cast by screen coating on the anode composite 4 under an atmosphere of dried inert gas, and irradiated with an electron beam having an electron beam intensity of 8 Mrad under an atmosphere of dried inert gas in order to be cured. The film thickness of the electrolyte layer 3 formed on the anode composite 4 was 25 μm.

In steps (a) to (d), the manufacturing method for the high-molecular weight compounds of formulas (XI) and (XII) and the apparatus for the manufacture were the same as for that of embodiment 11. That is, the high-molecular weight compounds of formulas (XI) and (XII) were prepared by esterification using polyethylene glycol, acrylic acid, sulfuric acid forming an acid catalyst, the compounds of formulas (XIII) and (XIV) forming the radical scavenger, and an organic solvent; and the prepared material was neutralized by using an alkali metal hydroxide and then washed by using an aqueous NaCl solution. In this embodiment, the quantity of the high-molecular weight compounds of formulas (XIII) and (XIV) to be added were predetermined.

(e) A laminate of the electrolyte layer 3, the cathode composite 2 and the positive current collector plate 1 prepared by step (b) and a laminate of the electrolyte layer 3, the anode composite 4 and the negative current collector plate 5 prepared by step (d) were brought into contact with each other at the respective electrolyte layers 3.

In the battery of this embodiment, the content of the compounds of formulas (XIII) and (XIV) in the battery were both 0.010 wt %. In order to set the content above, the quantity of the high-molecular weight compounds of formulas (XIII) and (XIV) to be added was determined in advance.

The contents of the compounds of formulas (XIII) and (XIV), that is the radical scavenger, were measured in the same manner as in embodiment 11. That is, the battery was subjected to centrifugation and extraction at the time of manufacture of the battery. Thereafter, each of the mixtures $D_{12}$, $E_{12}$, $H_{12}$ and $I_{12}$ were quantitatively measured by colorimetric determination, redox titration, etc. The values thus obtained were converted to those of the battery contents. The battery content of this embodiment comprise the cathode composite 2, the electrolyte layer 3, and the anode composite 4.

Comparison Example 10

The battery of this comparison example is different from that of embodiment 12 only in that, in the battery of this comparison example, the radical scavenger was not used at the time of manufacture of the battery. Therefore, the battery of this comparison example contains no radical scavenger.

Test 10

Charge/discharge cycle tests were done on the batteries of embodiment 12 and comparison example 10 in the same manner as test 2 to examine the respective charge/discharge cycle characteristics of the batteries when fresh and after long-term preservation.

Figure 18:
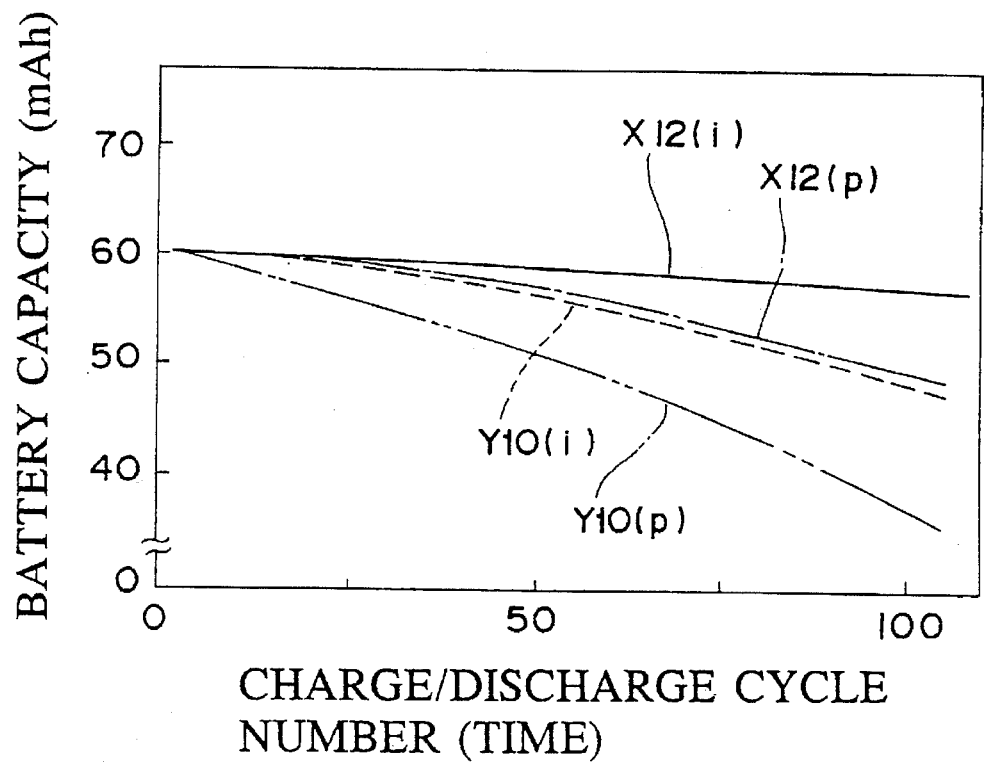
FIG. 18 is a diagram showing charge/discharge cycle characteristics at an initial stage and charge/discharge cycle characteristics after long-term preservation for the respective batteries of embodiment 12 and comparison example 10.

FIG. 18 shows charge/discharge cycle characteristics of the batteries when fresh and after long-term preservation. In FIG. 18, X12(i) indicates the charge/discharge cycle characteristic of the fresh battery of embodiment 12, X12(p) indicates the charge/discharge cycle characteristic after long-term preservation of the battery of embodiment 12, Y10(i) indicates the charge/discharge cycle characteristic of the fresh battery of comparison example 10, and Y10(p) indicates the charge/discharge cycle characteristic after long-term preservation of the battery of comparison example 10. Further, the abscissa represents the charge/discharge cycle number (time) and the ordinate represents the battery capacity (mAh).

As can be seen from FIG. 18, the battery of embodiment 12 has excellent charge/discharge cycle characteristics both when fresh and after long-term preservation as compared with the battery of comparison example 10.

Further, 40 cells of the respective batteries of embodiment 12 and comparison example 10 were examined to check for the fraction of defective cells after manufacture of the battery. The number of defective cells was zero for the battery of embodiment 12, but it was eight for the battery of comparison example 10. In other words, no defective cells were seen in the battery of embodiment 12. This may be attributable to the fact that, in the battery of comparison example 10, before the thin film comprising the ion-conductive high-molecular weight compound was formed, the high-molecular weight compounds of formulas (XI) and (XII) were naturally polymerized to form a thin film which has weak mechanical strength, so that short-circuiting occurs easily.

Further, the relationship between the rising rate of impedance inside the battery after preservation for 100 days at 60° C. and the content of radical scavenger was examined. When the content of the radical scavenger was about 0.1 wt % or less, the rising rate of impedance was extremely small.

The battery of the present invention, which has both excellent efficiency and long-term reliability, has a large practical industrial value.

What is claimed is:

1. A battery which comprises:

(A) a cathode comprising a cathode composite comprising an ion conductive high-molecular weight compound and a positive active material;

(B) an electrolyte comprising the ion conductive high molecular weight compound; and (C) an anode comprising:
  (1) an anode composite comprising the ion conductive high-molecular weight compound and a negative active material;

wherein said ion-conductive high molecular weight compound is prepared by esterification of polyethylene glycol and acrylic acid or methacrylic acid in the presence of sulfuric acid or para-toluenesulfonic acid and an organic solvent; and the thus-prepared material is neutralized with an alkali metal hydroxide and then washed with an aqueous alkali metal chloride solution;

wherein the battery contains no more than 0.1 weight percent sulphate ion, para toluenesulfonate ion, chlorine ion, polyethylene glycol, acrylic acid, methacrylic acid, or mixtures thereof.

2. A battery which comprises:

(A) a cathode comprising a cathode composite comprising an ion-conductive high-molecular weight compound and a positive active material;

(B) an electrolyte comprising the ion-conductive high molecular weight compound; and (C) an anode comprising:
  (1) an anode composite comprising the ion conductive high-molecular weight compound and a negative active material;

wherein lithium ion performs ionic conduction inside the battery, and wherein the battery contains no more than 0.1 weight percent of a multivalent ion and an alkali metal ion other than the lithium ion; and wherein said ion-conductive high-molecular weight compound is prepared by esterification of polyethylene glycol and acrylic acid or methacrylic acid in the presence of sulfuric acid or para toluenesulfonic acid and an inorganic solvent; and the thus prepared material is neutralized with an alkali metal hydroxide and then washed with an aqueous alkaline metal chloride solution.

3. A battery which comprises:

(A) a cathode comprising a cathode composite comprising an ion-conductive high molecular weight compound and a positive active material;

(B) an electrolyte comprising the ion-conductive high-molecular weight compound; and (C) an anode comprising:

(1) an anode composite comprising the ion-conductive high-molecular weight compound and a negative active material;

wherein a radical scavenger is included in the battery, said radical scavenger being present in an amount of no more than 0.1 weight percent; and wherein said ion-conductive high molecular weight compound is prepared by esterification of polyethylene glycol and acrylic acid or methacrylic acid in the presence of sulfuric acid or para toluenesulfonic acid and an inorganic solvent; and the thus-prepared material is neutralized with an alkali metal hydroxide and then washed with an aqueous alkali metal chloride solution.

4. A battery as set forth in claim 1, in which the ion-conductive high-molecular weight compound is prepared by polymerizing at least one high-molecular weight compound as shown in formula (I) and formula (II) in the presence of at least one ionic compound, wherein the compound of formula (I) has the following structure:

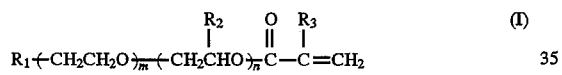

$R_1$, $R_2$ and $R_3$ represent hydrogen or a lower alkyl group having 1 or more carbon atoms, and m and n represent an integer in the range of $m \geq 1$, $n \geq 0$ and $n/m=0$ to 5, wherein the compound of formula (II) has the following structure:

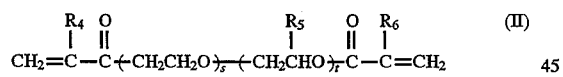

$R_4$, $R_5$ and $R_6$ represent hydrogen or a lower alkyl group having 1 or more carbon atoms, and s and t represent an integer in the range of $s \geq 3$, $t \geq 0$ and $t/s=0$ to 5.

5. A battery as set forth in claim 1, in which at least the cathode composite or anode composite includes a binder.

6. A battery as set forth in claim 2, in which the alkali metal ion is $Na^+$ or $K^+$, and the multivalent ion is $Ca^{2+}$, $Fe^{2+}$, $Cu^{2+}$, $Ni^{3+}$, $Fe^{3+}$, $Co^{3+}$ or $Cr^{3+}$.

7. A battery as set forth in claim 3, in which the radical scavenger is at least one member of the group consisting of the compounds shown by formula (III), formula (IV), formula (V) and formula (VI):

$R_{11}$ represents an alkyl group or alkoxyl group having 1 or more carbon atoms, or a hydroxyl group;

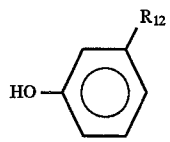

$R_{12}$ represents an alkyl group or alkoxyl group having 1 or more carbon atoms, or a hydroxyl group;

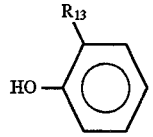

$R_{13}$ represents an alkyl group or alkoxyl group having 1 or more carbon atoms, or a hydroxyl group;

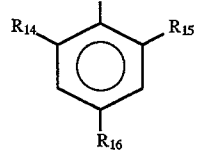

$R_{14}$, $R_{15}$, $R_{16}$ represent a lower alkyl group or lower alkoxyl group having 1 or more carbon atoms, or a hydroxyl group.

8. A method for manufacturing a battery which comprises a cathode composite comprising an ion-conductive high-molecular weight compound and a positive active material, an electrolyte comprising the ion-conductive high molecular weight compound, and an anode composite, said anode composite comprising the ion-conductive high molecular weight compound and a negative active material;

wherein said ion-conductive high molecular weight compound is made by polymerizing at least one high-molecular weight compound as shown in formula (I) and formula (II) in the presence of at least one ionic compound, said high molecular weight compound including a radical scavenger;

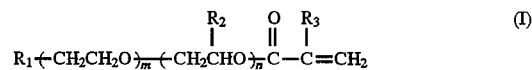

$R_1$, $R_3$ and $R_5$ represent hydrogen or a lower alkyl group having 1 or more carbon atoms, and m and n represent an integer in the range of $m \geq 1$, $n \geq 0$ and $n/m=0$ to 5;

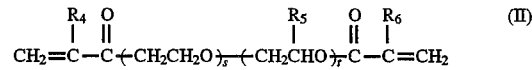

$R_4$, $R_5$ and $R_6$ represent hydrogen or a lower alkyl group having 1 or more carbon atoms, and s and t represent an integer in the range of $s \geq 3$, $t \geq 0$ and $t/s=0$ to 5.

9. A method for manufacturing a battery as set forth in claim 8, in which no more than 0.1 wt. 5 of the radical scavenger is present.

10. A method for manufacturing a battery as set forth in claim 8, in which the radical scavenger is selected from the group consisting of the compounds shown in formula (III), formula (IV), formula (V) and formula (VI)

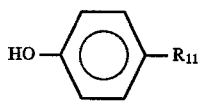  (III)

$R_{11}$ represents an alkyl group or alkoxyl group having 1 or more carbon atoms, or a hydroxyl group;

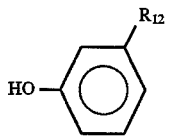  (IV)

$R_{12}$ represents an alkyl group or alkoxyl group having 1 or more carbon atoms, or a hydroxyl group;

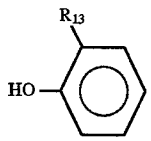  (V)

$R_{13}$ represents an alkyl group or alkoxyl group having 1 or more carbon atoms, or a hydroxyl group;

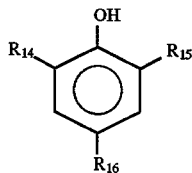  (VI)

$R_{14}$, $R_{15}$, $R_{16}$ represent a lower alkyl group or lower alkoxyl group having 1 or more carbon atoms, or a hydroxyl group.

11. A battery as set forth in claim 2, in which the ion-conductive high-molecular weigh compound is prepared by polymerizing at least one high-molecular weigh compound of formula (I) and formula (II) in the presence of at least one ionic compound, and wherein the compound of formula (I) has the following structure:

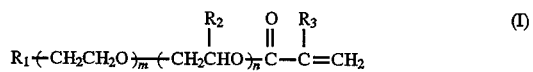  (I)

$R_1$, $R_2$ and $R_3$ represent hydrogen or a lower alkyl group having 1 or more carbon atoms, and m and n represent an integer in the range of $m \geq 1$, $n \geq 0$ and n/m=0 to 5, wherein the compound of formula (II) has the following structure:

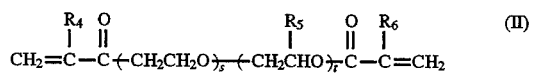  (II)

$R_4$, $R_5$ and $R_6$ represent hydrogen or a lower alkyl group having 1 or more carbon atoms, and s and t represent an integer in the range of $s \geq 3$, $t \geq 0$ and t/s=0 to 5.

12. A battery as set forth in claim 3, in which the ion-conductive high-molecular weight compound is prepared by polymerizing at least one high-molecular weight compound of formula (I) and formula (II) in the presence of at least one ionic compound, and wherein the compound of formula (I) has the following structure:

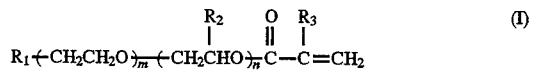  (I)

$R_1$, $R_2$ and $R_3$ represent hydrogen or a lower alkyl group having 1 or more carbon atoms, and m and n represent an integer in the range of $m \geq 1$, $n \geq 0$ and n/m=0 to 5, wherein the compound of formula (II) has the following structure:

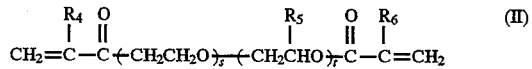  (II)

$R_4$, $R_5$ and $R_6$ represent hydrogen or a lower alkyl group having 1 or more carbon atoms, and s and t represent an integer in the range of $s \geq 3$, $t \geq 0$ and t/s=0 to 5.

13. A battery as set forth in claim 2, in which at least the cathode composite or anode composite includes a binder.

14. A battery as set forth in claim 3, in which at least the cathode composite or anode composite includes a binder.

* * * * *

UNITED STATES PATENT AND TRADEMARK OFFICE
CERTIFICATE OF CORRECTION

PATENT NO. : 5,658,687
DATED : August 19, 1997
INVENTOR(S) : Kazunari TAKEDA et al.

It is certified that error appears in the above-indentified patent and that said Letters Patent is hereby corrected as shown below:

TITLE PAGE:
   Item [73] Assignee, "Yusasa Corporation" is changed to --Yuasa Corporation--.

Signed and Sealed this

Seventeenth Day of March, 1998

Attest:

BRUCE LEHMAN

Attesting Officer    Commissioner of Patents and Trademarks